(12) United States Patent
Kando et al.

(10) Patent No.: US 8,105,160 B2
(45) Date of Patent: Jan. 31, 2012

(54) VIDEO GAME PROCESSING APPARATUS, METHOD, AND A COMPUTER-READABLE MEDIUM FOR PROCESSING A VIDEO GAME INCLUDING A VARIABLY DISPLAYED LIFE POINT METER

(75) Inventors: Tatsuya Kando, Tokyo (JP); Tomohiro Hasegawa, Tokyo (JP); Takeshi Arakawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1189 days.

(21) Appl. No.: 11/846,755

(22) Filed: Aug. 29, 2007

(65) Prior Publication Data

US 2008/0119268 A1 May 22, 2008

(30) Foreign Application Priority Data

Nov. 16, 2006 (JP) ................. 2006-310168

(51) Int. Cl.
*A63F 9/24* (2006.01)
*A63F 13/00* (2006.01)
(52) U.S. Cl. .................. 463/31; 463/7; 463/8
(58) Field of Classification Search ............ 463/7–10, 463/31
See application file for complete search history.

(56) References Cited

U.S. PATENT DOCUMENTS

| | | |
|---|---|---|
| 6,267,674 B1 | 7/2001 | Kondo et al. |
| 6,652,384 B2 | 11/2003 | Kondo et al. |
| 2001/0029201 A1 | 10/2001 | Minami |
| 2003/0040364 A1 | 2/2003 | Yabe et al. |

FOREIGN PATENT DOCUMENTS

| | | |
|---|---|---|
| JP | 11-300045 | 11/1999 |
| JP | 2001-129244 | 5/2001 |
| JP | 2001-276432 | 10/2001 |
| JP | 2002-292130 | 10/2002 |
| JP | 2003-062345 | 3/2003 |
| JP | 2004-230179 | 8/2004 |
| JP | 2005-74199 | 3/2005 |
| JP | 2005-312655 | 11/2005 |

OTHER PUBLICATIONS

English language Abstract of JP 2005-312655.
English language Abstract of JP 2002-292130.
Drum Mania, Dengeki PlayStation, Media Works, Japan, Mar. 10, 2000, vol. 6, Issue No. 7, p. 50-51.

(Continued)

*Primary Examiner* — Melba Bumgarner
*Assistant Examiner* — Lawrence Galka
(74) *Attorney, Agent, or Firm* — Greenblum & Bernstein, P.L.C.

(57) ABSTRACT

An image display apparatus is caused to display a life point meter for showing a total remaining life point within a life point display region on an image display screen. When an action or event occurs to any player character so that the remaining life point thereof changes, an amount of change of a life point thereof is calculated in response to the action or the event. It is determined that the battle possible state of all player characters can be maintained except that the amount of decrease of the life point is the total remaining life point or more. In the case where the remaining life point of the corresponding player character is updated on the basis of the calculated amount of change of the life point, the image display apparatus is caused to change a display form of the life point meter assigned to the corresponding player character.

18 Claims, 11 Drawing Sheets

OTHER PUBLICATIONS

The Lost World Jurassic Park, Gamest, Shinseisha Ltd., Japan, Jan. 15, 1998, vol. 13, Issue No. 2, pp. 140-142.
Phantasy Star Online Eternal Arcadia, Dengeki Game Cube, Media Works, Japan, Mar. 1, 2002, vol. 2, Issue No. 3, pp. 23.
Nintendo Official Guide Book Koro Puzzle Happy Panecchu!, Shogakukan, Japan, Apr. 20, 2002, first edition, pp. 39-41.
Evergrace II, Dengeki PlayStation, Media Works, Japan, Mar. 8, 2001, vol. 7, Issue No. 16.
English language Abstract of JP 11-300045.
English language Abstract of JP 2005-74199.
English language Abstract of JP 2001-129244.
English language Abstract of JP 2001-276432.
U.S. Appl. No. 11/846,924 to Hasegawa et al., filed Aug. 29, 2007.
"Square ENIX ga hanatsu Shibuya wo butai ni shita RPG! "Subarashiki kono sekai"" [online], Fami-tsu.com, Sep. 26, 2006, [searched on Jul. 14, 2008], Internet <URL:http://www.famitsu.com/game/coming/2006/09/26/104, 1159256684, 60848, 0, 0.html>.

VIDEO GAME PROCESSING APPARATUS, METHOD, AND A COMPUTER-READABLE MEDIUM FOR PROCESSING A VIDEO GAME INCLUDING A VARIABLY DISPLAYED LIFE POINT METER

CROSS-REFERENCE TO RELATED APPLICATION

The present disclosure relates to subject matter contained in Japanese Patent Application No. 2006-310168, filed on Nov. 16, 2006, the disclosure of which is expressly incorporated herein by reference in its entirety.

BACKGROUND OF THE INVENTION

1. Field of the Invention

The present invention relates to a technique for controlling progress of a video game by displaying a plurality of player characters on an image display screen of an image display apparatus, and by controlling an action of each of the plurality of player characters displayed on the image display screen in response to operation(s) by a player.

2. Description of the Related Art

Heretofore, various kinds of so-called role playing games (RPG; that is, a game in which a player plays a role of a character in a world of the game to accomplish a predetermined object while enjoying a process that the character grows through various experiences) have been provided.

In such a RPG, generally, a player character acting in response to operations by the player wins a battle against an enemy character thwarting accomplishment of a predetermined object in the RPG, by which various benefits such as an experiential value are supplied to the player character.

There are some video games, in which a plurality of player characters execute a battle against an enemy character in cooperation with each other like a tag-team match, among video games such as an RPG. In this case, it is known a video game in which a player specifies battle commands for respective player characters and a battle is then executed after completing command specification for the player characters. It is also known, as a category of so-called action RPG, a video game in which an attack action is instantaneously executed when a player specifies a battle command by pressing any of buttons of a controller or the like, to which battle commands are in advance assigned to specify the attack actions, by which a battle is executed in real time.

For example, a video game and a game apparatus in which a player operates a plurality of player characters to execute a tag-team match so as to cooperate with each other, whereby the video game proceeds has been proposed (for example, see Japanese Patent Application Publication No. 2001-276432 (hereinafter, referred to as "patent document 1")).

Further, a video game and a game program in which a display gauge relating to life points (hit points) indicating life points of a plurality of player characters is shared with the player characters, a point subtracted from a life point of a player character that suffers an attack is to be added to a life point of a player character that attacks the player character, the current life points of the respective player characters are thereby displayed so as to display the condition thereof, whereby the video game proceeds has also been proposed (for example, see Japanese Patent Application Publication No. 2003-62345 (hereinafter, referred to as "patent document 2")).

Moreover, a video game and an image processing apparatus in which a plurality of display gauges showing usable conditions of a plurality of weapons and magic that allow a player character to execute one from various attack methods to an enemy character are displayed in an integrated manner, whereby the video game proceeds has also been proposed (for example, see Japanese Patent Application Publication No. 2004-230179 (hereinafter, referred to as "patent document 3")).

However, in the game apparatus disclosed in the patent document 1 described above, although the tag-team match can be executed, the number of player characters that the player can operate is merely one. For this reason, there has been a problem that it is hard for one player to operate the plurality of player characters to enjoy the video game. Further, in the game program disclosed in the patent document 2 described above, when the life point of one player character becomes zero, a conventional process that the one player character becomes a battle impossible state, for example, for a predetermined period of time is executed. For this reason, there has been a problem that a player operating the one player character that has become the battle impossible state cannot take part in the video game at least temporarily, and it's hard to say that a device to improve interest of the video game is particularly provided. Moreover, in the image processing apparatus disclosed in the patent document 3, a parameter for attack that the player character can use is merely displayed as the display gauge in the integrated manner. For this reason, there has been a problem that the player cannot grasp the current life point of the player character, whereby there is a fear to lower the interest of some players in the video game.

SUMMARY OF THE INVENTION

It is one object of the present invention to solve the problems described above and to provide a video game processing apparatus, a method and a computer program product for processing a video game capable of displaying life points of a plurality of player characters in a video game so that a player easily grasps them when operating the plurality of player characters, of causing the player to easily view a present state of the life point of each of the player characters, and of heightening strategic thought of the player at the tag-team match, by which it is possible to improve interest of the player in the video game.

In order to achieve the above object, an aspect of the present invention is directed to a video game processing apparatus that causes an image display apparatus to display a plurality of player characters on an image display screen of the image display apparatus. The video game processing apparatus (for example, a video game apparatus main body 10, a video game apparatus 100) controls progress of the video game by controlling an action of each of the plurality of player characters to be displayed on the image display screen in accordance with operations by a player. The video game processing apparatus of the present invention includes a remaining life point manager that manages a remaining life point of each of the plurality of player characters.

The video game processing apparatus also includes a life point display controller that causes the image display apparatus to display a life point meter for showing a total remaining life point within a life point display region on the image display screen, the total remaining life point indicating the total sum of the remaining life points of the plurality of player characters.

The video game processing apparatus also includes a life point variation calculator that calculates, when an action or an event occurs with respect to any one of the plurality of player characters so that the remaining life point of the corresponding player character changes, an amount of change of a life point of the player character in response to the action or the event.

The video game processing apparatus also includes a battle maintenance determiner that determines whether a battle possible state of all of the player characters can be maintained or not by comparing the amount of change of the life point calculated by the life point variation calculator with the total sum of the remaining life points of the player characters managed by the remaining life point manager.

The video game processing apparatus also includes a life point updater that updates the remaining life point of the corresponding player character on the basis of the amount of change of the life point calculated by the life point variation calculator.

In this case, the battle maintenance determiner determines that the battle possible state of all of the player characters can be maintained except that the amount of change of the life point, calculated by the life point variation calculator, to be subtracted from the total remaining life point is the total remaining life point or more. In addition, in the case where the life point updater updates the remaining life point of any player character managed by the remaining life point manager, the life point display controller causes the image display apparatus to change a display form of a part of the life point meter assigned to the corresponding player character.

Since the video game processing apparatus may have a configuration as described above, it is possible to display the remaining life points of the player characters in the life point meter in which a display form thereof is changed in accordance with the remaining life point together. In addition, it is also possible to display the amount of change of the life point of a predetermined player character at the same time. Thus, it is possible to display the life points of the plurality of player characters in the video game so that a single player can easily grasp the life points of the plurality of player characters when operating the plurality of player characters, and it is possible for the player to easily view a present state and transition of the life point of each of the player characters Therefore, it is possible to heighten strategic thought in the tag-team match, and this makes it possible to improve interest of the player in the video game.

It is preferable that, in the case where any player character suffers an attack from an attack target character for the player character, the life point variation calculator calculates the amount of change of the life point for subtracting a damage point in accordance with the attack from the remaining life point of the corresponding player character, and that, in the case where an event to recover the life point of any player character occurs for the player character, the life point variation calculator calculates the amount of change of the life point for adding a recovery point in accordance with the event to the remaining life point of the corresponding player character.

It is preferable that the life point display controller causes the image display apparatus to further display another life point meter for showing a remaining life point of a specific attack target character in a display region other than the life point display region on the image display screen. Since the video game processing apparatus may have a configuration as described above, it is possible for the player to easily view a present state and transition of the life point of the specific attack target character in addition to the plurality of player characters. This makes it possible to improve interest of the player in the tag-team match of the video game.

It is preferable that the video game processing apparatus further includes an individual life point display controller that causes the image display apparatus to display individual life point meters for respectively showing the remaining life points of the plurality of player characters in the life point display region on the image display screen.

It is preferable that the life point display controller causes the image display apparatus to display the life point meter into which the individual life point meters respectively corresponding to the plurality of player characters are incorporated.

It is preferable that the number of the plurality of player characters is two, and the life point meter is a bar-shaped meter formed by connecting the two individual life point meters, respectively assigned to the two player characters, with each other so as to become a bar shape, the remaining life point of each of the two player characters is displayed so that a bonding surface between the two individual life point meters is set to a starting point of each of the two individual life point meters, and each individual life point meter extends from the starting point thereof to a direction opposite to the starting point. In this case, it is preferable that, in the case where the remaining life point of any one of the two player characters is shown so as to be reduced in accordance with the remaining life point updated by the life point updater, the life point display controller causes the image display apparatus to change a display form of the corresponding individual life point meter so that an ending point of the individual life point meter is moved toward the starting point thereof, and that, in the case where the remaining life point of any one of the two player characters is shown so as to be increased in accordance with the remaining life point updated by the life point updater, the life point display controller causes the image display apparatus to change a display form of the corresponding individual life point meter so that an ending point of the individual life point meter is moved in the direction away from the starting point thereof. Since the video game processing apparatus may have a configuration as described above, it is possible for the player to further easily view a present state and transition of the life point of each of the player characters. Therefore, it is possible to heighten strategic thought in the tag-team match, and this makes it possible to improve interest of the player in the video game.

It is preferable that the life point display controller causes the image display apparatus to display the remaining life points of the two player characters in which a boundary between the remaining life points of the two player characters is set to zero point of life point in each of the individual life point meters, and that, in the case where the remaining life point of any one of the two player characters is to be reduced or increased over the zero point of the life point in the corresponding individual life point meter, the life point display controller causes the image display apparatus to display the ending point of the individual life meter indicating the remaining life point of the corresponding player character so as to be capable of moving over the zero point of the life point in the corresponding individual life meter. Since the video game processing apparatus may have a configuration as described above, even in the case where the life point of one player character becomes zero, it is possible for the player to further easily view a present state and transition of the life point of other player character(s) while continuing to play the video game so long as the life point of the other player character still remains. Therefore, it is possible to heighten strategic thought in the tag-team match, and this makes it possible to improve interest of the player in the video game.

It is preferable that, in the case where the image display apparatus comprises two image display screens, the life point display controller causes the image display apparatus to display the life point display region so as to cross the two image display screens, and to display the individual life point meters so that a boundary position between the two adjacent image display screens is set to the zero point of the life point. Since the video game processing apparatus may have a configuration as described above, it is possible for the player to easily view a present state and transition of the life point of each of the player characters displayed on the plurality of image display screens in real time and uniquely. Therefore, it is possible to heighten strategic thought in the tag-team match, and this makes it possible to improve interest of the player in the video game.

It is preferable that, in the case where the battle maintenance determiner determines that the battle possible state of all of the two player characters cannot be maintained because the amount of change of the life point, calculated by the life point variation calculator, to be subtracted from the total remaining life point is the total remaining life point or more, the life point display controller causes the image display apparatus to display the life point meter so that the ending points of the two individual life point meters are overlapped with each other in the life point display region. Since the video game processing apparatus may have a configuration as described above, it is possible for the player to easily view a present state and transition of the life point of each of the player characters. In addition, it is possible for the player to view the end of the video game obviously. Therefore, it is possible to heighten strategic thought in the tag-team match, and this makes it possible to improve interest of the player in the video game.

It is preferable that the video game processing apparatus further includes a player character display controller that causes the image display apparatus to respectively display the plurality of player characters on a plurality of display regions different from each other, wherein the life point display controller causes the image display apparatus to display a part of the life point meter corresponding to each of the plurality of player characters on the display region on which the corresponding player character is displayed.

It is preferable that the life point updater updates the remaining life point even in the case where the remaining life point of any one of the plurality of player characters becomes a negative quantity.

It is preferable that the video game processing apparatus further includes a special display controller that causes the image display apparatus to display, with a special form, any one of the player characters whose remaining life point becomes a negative quantity, the background of the image display screen on which the corresponding player character is displayed, and a part of the life point meter corresponding to the player character.

Further, according to another aspect of the present invention, the present invention is directed to a method of processing a video game by causing an image display apparatus to display a plurality of player characters of the video game on an image display screen of the image display apparatus. In this case, the method controls progress of the video game by controlling an action of each of the plurality of player characters to be displayed on the image display screen in accordance with an operation by a player. The method of the present invention includes causing the image display apparatus to display a life point meter for showing a total remaining life point within a life point display region on the image display screen, the total remaining life point indicating the total sum of remaining life points of the plurality of player characters, the remaining life points being respectively managed for the plurality of player characters.

The method also includes, when an action or an event occurs with respect to any one of the plurality of player characters so that the remaining life point of the corresponding player character changes, calculating an amount of change of a life point of the player character in response to the action or the event.

The method also includes determining whether a battle possible state of all of the player characters can be maintained or not by comparing the amount of change of the life point thus calculated with the total sum of the remaining life points thus managed.

The method also includes updating the remaining life point of the corresponding player character on the basis of the amount of change of the life point thus calculated.

In this case, in the determining whether a battle possible state, it is determined that the battle possible state of all of the player characters can be maintained except that the amount of change of the life point thus calculated to be subtracted from the total remaining life point is the total remaining life point or more. In addition, in the updating the remaining life point, in the case where it is updated the remaining life point of any player character thus managed, the image display apparatus is caused to change a display form of a part of the life point meter assigned to the corresponding player character.

Moreover, according to still another aspect of the present invention, the present invention is directed to a computer program product for processing a video game. In this case, progress of the video game is controlled by causing an image display apparatus to display a plurality of player characters of the video game on an image display screen of the image display apparatus, and controlling an action of each of the plurality of player characters to be displayed on the image display screen in accordance with an operation by a player. The computer program product of the present invention causes a computer (for example, the video game apparatus 100, including the video game apparatus main body 10) to execute steps including causing the image display apparatus to display a life point meter for showing a total remaining life point within a life point display region on the image display screen, the total remaining life point indicating the total sum of remaining life points of the plurality of player characters, the remaining life points being respectively managed for the plurality of player characters.

The steps also include, when an action or an event occurs with respect to any one of the plurality of player characters so that the remaining life point of the corresponding player character changes, calculating an amount of change of a life point of the player character in response to the action or the event.

The steps also include determining whether a battle possible state of all of the player characters can be maintained or not by comparing the amount of change of the life point thus calculated with the total sum of the remaining life points thus managed.

The steps also include updating the remaining life point of the corresponding player character on the basis of the amount of change of the life point thus calculated.

In this case, in the determining whether a battle possible state, it is determined that the battle possible state of all of the player characters can be maintained except that the amount of change of the life point thus calculated to be subtracted from the total remaining life point is the total remaining life point or more. In addition, in the updating the remaining life point, in the case where it is updated the remaining life point of any player character thus managed, the image display apparatus is caused to change a display form of a part of the life point meter assigned to the corresponding player character.

According to the present invention, it is possible to display the remaining life points of the player characters in the life point meter in which a display form thereof is changed in accordance with the remaining life point together. In addition, it is also possible to display the amount of change of the life point of a predetermined player character at the same time. Thus, it is possible to display the life points of the plurality of player characters in the video game so that a single player can easily grasp the life point of the plurality of player characters when operating the plurality of player characters, and it is possible for the player to easily view a present state and transition of the life point of each of the player characters. Therefore, it is possible to heighten strategic thought in the tag-team match, and this makes it possible to improve interest of the player in the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
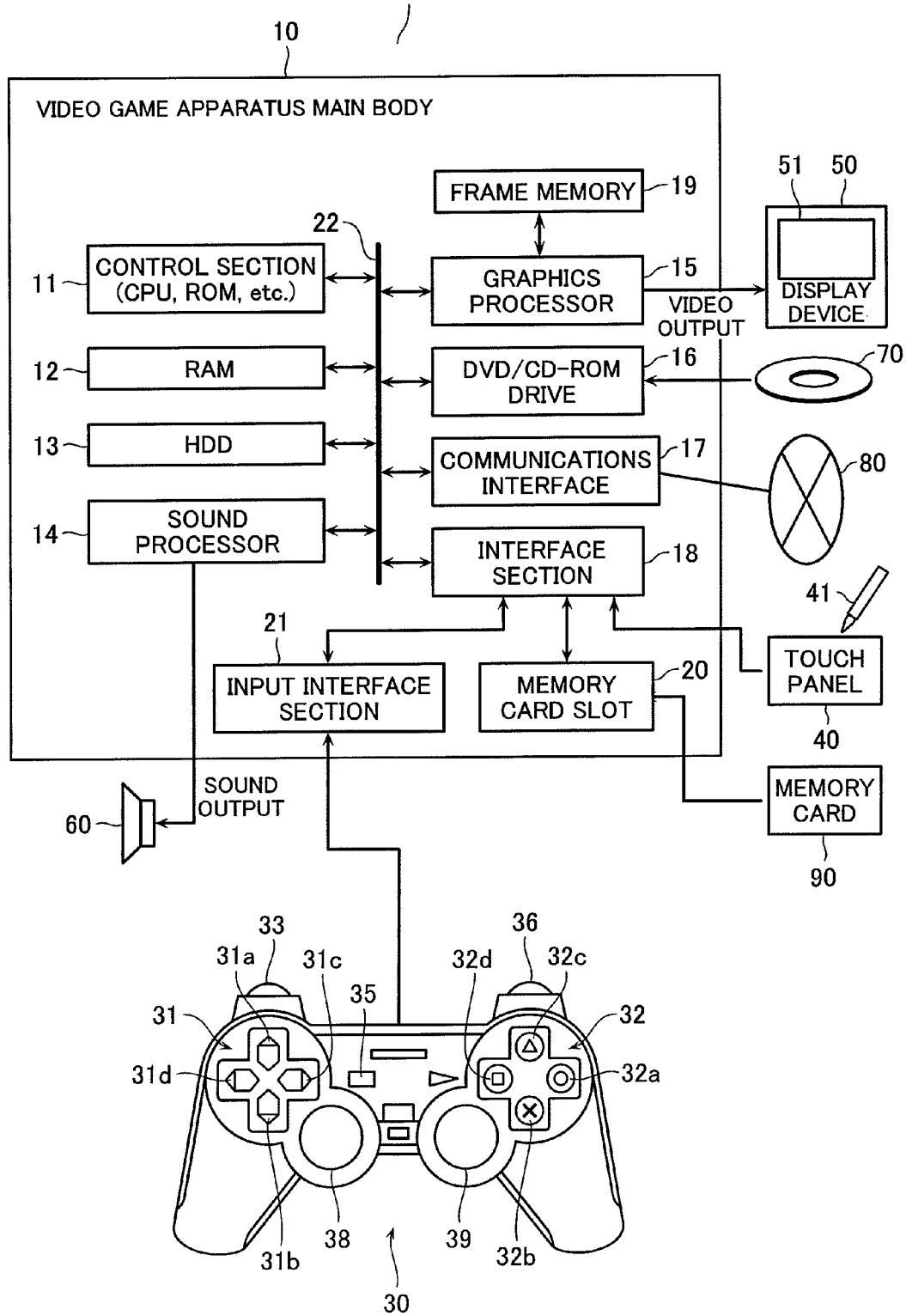
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with a plurality of image display screens including an upper image display screen 51 and a lower image display screen 52. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption, for example. The RAM 12 is mainly used as a work area for the control section 11. The HDD 13 is a storage area in the video game apparatus main body 10 for storing the control programs and various data.

The sound processor 14 has a function of an audio input/output interface for carrying out D/A conversion and A/D conversion of a sound signal (or audio signal). The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the various control programs. Further, the sound processor 14 is also connected to a sound input device (not shown in the drawings) constituted from a microphone, for example. A sound signal from the sound input device is inputted into the sound processor 14 in accordance with a sound input command from the control section 11. In this regard, the sound output device 60 may be embedded in the display device 50 or the video game apparatus main body 10, or may be affixed to a vibrating surface that may be caused to generate the audible signal.

The graphics processor 15 is connected to the display device 50 including the upper image display screen 51 and the lower image display screen 52 on each of which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the upper and lower image display screens 51, 52 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70. The storage medium 70 may be, other than the DVD-ROM or the CD-ROM described above, various types of DVD (such as DVD-RAM, DVD-R, DVD-RW, DVD+R, DVD+RW or DVD+RDL) or various types of CD (such as CD-R or CD-RW). In this case, in place of or in addition to the DVD/CD-ROM drive 16, the video game apparatus main body 10 may be provided with a drive for executing processes to read out and/or write various kinds of data from and/or into the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21, the memory card slot 20 and a touch panel 40 as an operation input section (or controller) is connected to the interface section 18. The interface section 18 causes instruction data from the input interface section 21 and instruction data from the touch panel 40 to be stored in the RAM 12 on the basis of operation(s) of a controller device such as a keypad 30 and operation(s) of the touch panel 40 using a touch pen 41 by a player of the video game apparatus 100. In response to the instruction data stored in the RAM 12, the control section 11 executes various arithmetic processing.

In this regard, the touch panel 40 may be used so as to be laminated on at least one of the upper and lower image display screens 51, 52, for example. In this case, the control section 11 recognizes (or senses) input information in accordance with operational inputs by operation(s) for inputs from the player by managing and controlling display timing on at least one of the upper and lower image display screens 51, 52 on which the touch panel 40 is laminated, operation timing to the touch panel 40 using the touch pen 41 or the like, and the position coordinates of the touch panel 40 with which the touch pen 41 is in contact.

By laminating the touch panel 40 on at least one of the upper and lower image display screens 51, 52 in this manner, the player is allowed to input much information along with the keypad 30 without making the controller device (including the keypad 30) of the player bigger. Here, as the type of the touch panel 40, various types of conventional touch panels such as a resistive touch panel and a pressure-sensitive touch panel can be utilized.

The video game apparatus main body 10 is connected to the touch panel 40 via the interface section 18 as described above. The video game apparatus main body 10 is also connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X key 32b, a triangle key 32c and a square key 32d. Further, a select button 35 and a start button 37 are arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 constituted in this manner is provided with multiple switches respectively connected to the cross key 31, the circle button 32a, the X button 32b, the triangle button 32c, the square button 32d, the select button 35, the start button 37, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) (that is, operational inputs) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12.

The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, PC: a character that moves in accordance with the operation of the keypad 30 and/or the touch panel 40 by the player), move on a field provided in a virtual three-dimensional space displayed on the upper and lower image display screens 51, 52, by which the video game proceeds. In this regard, it is assumed that the virtual three-dimensional space in which the field is formed is indicated by coordinates of the world coordinate system. Further, the field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that at least one player character PC and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
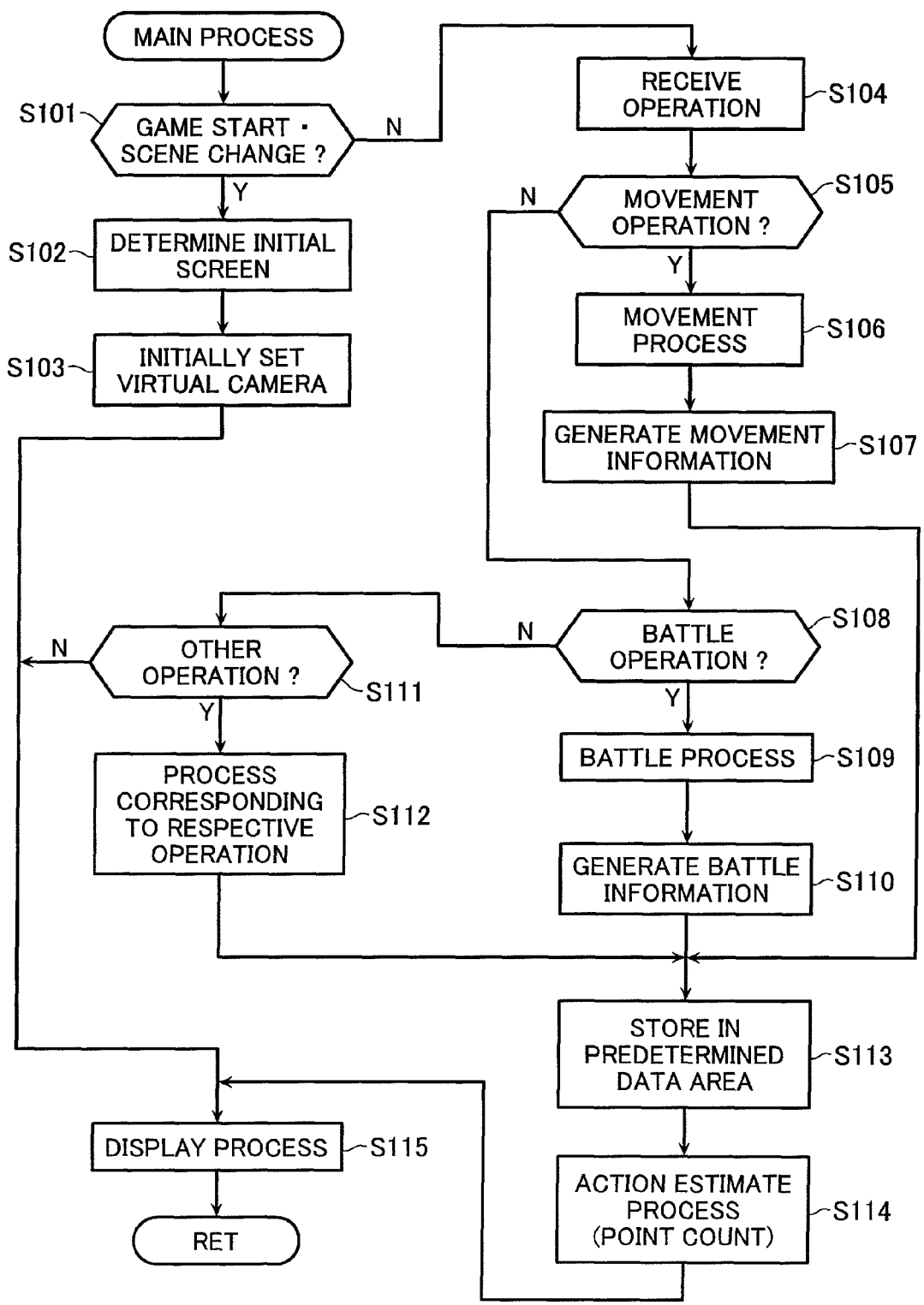
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every 1/30 second. However, it is to be noted that timing of "at every 1/30 second" is only one example, as mentioned above. Instead, for example, the main process may be executed in accordance with a timer interruption at every single field period (every 1/60 second) or at every two frame periods (every 1/15 second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character PC and a battle by the player character PC, are allowed. In the case where a predetermined object in the field is accomplished, one stage may be terminated and the processing may proceed to another stage executed in a next field.

Further, in the present embodiment, a same time base is applied to the respective characters existing in such a field for a battle scene. Once a NPC enters the stage in the field such as a battle scene, the NPC moves on the field or stands still on the field in accordance with the same time base until a hit point (which is a value indicating life force, and hereinafter, referred to simply as "HP" (life point)) thereof becomes zero. In the case where the HP of the player character PC becomes zero in a battle scene in which one player character PC exists, the player character PC becomes a battle impossible state. Then, the video game is terminated, or other event occurs.

However, in the present embodiment, for example, in the case where a plurality of player characters PCs enter the stage in the field, all of the plurality of player characters PC do not become a battle impossible state so long as the HPs of all of the plurality of player characters PC become zero. Namely, for example, in the case where the HP of one player character PC still remains even when the HP of the other player character PC becomes zero, the respective player characters, including the other player character PC whose HP becomes zero, can keep (or maintain) the battle states. In this case, a portion displayed on each of the upper and lower image display screens 51, 52 as a character image is a portion that exists within the field of view of a virtual camera in the field.

In the main process, the control section 11 determines whether an instruction to start a video game is generated through an operation of the keypad 30 and/or the touch panel 40, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101).

The timing state to change the scene which is determined at Step S101 is, for example, the time at which a virtual three-dimensional space illustrating a new scene is displayed on the respective upper and lower image display screens 51, 52 in order to finish the scene that has been displayed on the respective upper and lower image display screens 51, 52 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102).

In this case, various data, such as image data used for the video game and characters or icons, are stored in the storage medium 70. At Step S102, an initial display position of the player character PC in an initial screen or a scene after a scene change (for example, a new stage in the RPG), a non-player character NPC or non-player characters NPCs to be displayed, an initial display position of each of the non-player characters NPCs to be displayed, an icon or icons to be displayed, an initial display position of each of the icons to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 and/or the touch panel 40 by the player (Step S104). Namely, the control section 11 determines whether or not instruction data for executing movement of the player character PC or the like are inputted from the keypad 30 and/or the touch panel 40 via the input interface section 21. In the case where effective instruction data (that is, it means that such effective instruction data are instruction data that is allowed to be received by the control section 11) are inputted, the control section 11 receives the effective instruction data.

In the present embodiment, for example, the video game apparatus 100 is in advance constructed so that the player character PC displayed on the upper image display screen 51 can be operated by means of the keypad 30, while the player character PC displayed on the lower image display screen 52 can be operated by means of the touch panel 40. Further, the player character PC displayed on the upper image display screen 51 is set so as not to be allowed to move, and the processes at Steps S105 to S107 are applied only to the player character PC displayed on the lower image display screen 52. In this regard, in the present embodiment, the player characters PCs that can respectively be operated by means of the keypad 30 and the touch panel 40 may be switched to each other. The player characters PCs that can be operated may be set to be different from each other in accordance with each of the cross key 31 and the group of buttons 32 of the keypad 30 or each of detection regions in the case where the touch panel 40 are divided into the plurality of detection regions.

In the case where the control section 11 receives instruction data for instructing an action of the player character PC relating to the movement of the player character PC (that is, movement instruction data: selection of a movement instruction by a movement command to the touch panel 40 by the touch pen 41 or movement instruction to the player character PC displayed on the lower image display screen 52 (that is, on the touch panel 40) by means of the touch pen 41) in accordance with the operation of the touch panel 40 relating to the movement of the player character (movement operation) at Step S104 ("Yes" at Step S105), the control section 11 executes a movement process in accordance with the movement instruction data thus received (Step S106).

In the movement process at Step S106, the control section 11 causes the position of the player character PC to be moved in a virtual space (on the present field) in accordance with the received movement instruction data. In this regard, such a movement command may include a dash instruction command, for example. The dash instruction command is a command to move the player character PC quickly, and a command for supplying an instruction that the player character PC moves from a predetermined region of a battle area toward other region quickly if the player character PC is in a melee, for example.

Subsequently, the control section 11 generates movement information on the basis of the position information of the player character PC derived along with the movement process (Step S107). Namely, in accordance with the movement of the position of the player character PC by means of the movement process, the control section 11 updates necessary data among data on the viewpoint position of the virtual camera, data on the direction of a visual axis, data on the size of a visual angle, and the like. The control section 11 then changes the setting content of the virtual camera.

The movement information generated at Step S107 includes various kinds of information on the movement such as the position of the player character PC after the movement, the viewpoint position of the virtual camera, the direction of the visual axis, and the size of the visual angle changed along with the movement of the player character PC as well as the information on the movement of the player character PC. Then, the processing flow proceeds to Step S113.

In the case where the control section 11 receives instruction data for instructing an action for the player character PC relating to a battle (that is, battle instruction data: a battle command) in accordance with the operation of the keypad 30 and/or the touch panel 40 by the player for instructing the action of the player character relating to a battle (a battle operation) at Step S104 ("Yes" at Step S108), the control section 11 executes a battle process in accordance with the received battle instruction data (Step S109).

More specifically, in the video game apparatus 100 of the present embodiment, in the case where the operational inputs to instruct the player character PC to execute an action for a battle is carried out by input operations using the cross key 31 and/or the group of buttons 32 of the keypad 30 or input operations using the touch pen 41 to the touch panel 40, the control section 11 determines that the instruction data is received ("Yes" at Step S108), and then executes the battle process (Step S109). In the battle process executed at Step S109, the control section 11 executes, for example, a process to determine a battle result and/or battle development between an enemy character (that is, a non-player character to battle against) and the player character PC, and the like.

Subsequently, the control section 11 generates battle information on the basis of the battle result and/or battle development determined by means of the battle process (Step S110). Namely, in accordance with the battle result and/or battle development by the battle process, the control section updates and sets necessary information. The set information may include, for example, the name of the player character PC that battles an enemy character in the battle process, the name of the enemy character, battle development information, battle result information, a parameter (or parameters) that defines the ability (or abilities) of the player character PC, and the like. The battle information includes various kinds of information on the battle, such as the name of the player character PC that battles the enemy character, the name of the enemy character, battle development, battle result thereof, and a parameter that defines the ability of the player character PC. Then, the processing flow proceeds to Step S113.

In the case where the control section 11 receives instruction data for other instructions (that is, other instruction data: an other command) in accordance with the operation of the keypad 30 and/or the touch panel 40 for executing other instruction (other operation) at Step S104 ("No" at Step S105, "Now" at Step S108, and "Yes" at Step S111), the control section 11 executes a process (for example, a conversation between characters, a purchase action, a pick up action, a movement action of an item and the like) in accordance with the other instruction data thus received (Step S112). The other information corresponding to the process result at Step S112 is then generated, and the processing flow proceeds to Step S113.

The control section 11 updates the current position of the player character PC by storing the movement information generated at Step S107 in a predetermined data area of the RAM 12 at Step S113. Further, the control section 11 memorizes and stores various action histories of the player character PC by storing the battle information generated at Step S110 and the other information generated after Step S112 in a predetermined data area of the RAM 12 at Step S113.

Subsequently, the control section 11 executes an action estimate process on the basis of the information indicating the action histories of the player character PC once stored in the RAM 12 (Step S114). More specifically, information required to be digitized is digitized using conversion tables prepared in advance. Further, with respect to information required to be weighted, a score is calculated by multiplying the digitized value by a predetermined coefficient and summing these multiplied digitized values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character PC and the non-player characters NPCs to be displayed from the virtual camera onto the virtual screen in accordance with the setting contents of the virtual camera and the like. The control section 11 then executes a display process to generate a two-dimensional image to be displayed on the upper and lower image display screens 51, 52 (Step S115).

When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the upper and lower image display screens 51, 52.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character PC and the three-dimensional non-player characters NPCs are included, from the coordinates of the world coordinate system to the coordinates of the viewpoint coordinate system.

Subsequently, the control section 11 transmits the coordinates of the vertexes of the polygons of the player character PC and the non-player characters NPCs in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the upper and lower image display screens 51, 52. By switching images displayed on the upper and lower image display screens 51, 52 every single frame period, the player can see images including the state where the player character PC and/or the non-player characters NPCs are moved on the field and perceive the images as moving images.

In the video game apparatus 100 of the present embodiment, during the battle process at Steps S108 to S110 described above, the HPs of the plurality of player characters PC respectively operated by the player through the keypad 30 and the touch panel 40 are displayed in a single HP display region (HP gauge) by a bar-shaped meter whose display form is changed in accordance with the remaining HP value of each of the player characters PC.

Thus, it is possible to display the state of the remaining HPs of all of the player characters together. In addition, it is also possible to display transition (change state) of the HP of a predetermined player character PC at the same time. This realizes a new game element that the HP values of the plurality of player characters PC are displayed so that a single player can easily grasp the HP values of the plurality of player characters PC when operating the plurality of player characters PC, and the player can easily view a present state and transition of the HP value of each of the player characters PC, whereby strategic thought is heightened in the tag-team match in cooperation with the player characters PC to improve interest of the player in the video game.

More specifically, the video game apparatus 100 of the present embodiment adopts a technique in which the video game proceeds while the plurality of player characters PC, for example, including two player characters PC respectively displayed on the upper and lower image display screens 51, 52 of the display device 50 are caused to cooperate with each other by respectively operating the two player characters via the keypad 30 and the touch panel 40, which are respectively associated with the plurality of player characters PC, by the player.

In this case, a single bar-shaped mater for jointly displaying the HP values of the respective player characters PC is displayed in a single HP gauge of the upper and lower image display screens 51, 52 displayed in a state that the bar-shaped meter crosses the upper and lower image display screens 51, 52. The bar-shaped meter is displayed in a seamless manner of the upper and lower image display screens 51, 52 for the remaining HP values of the respective player characters PC. In such a case, the remaining life points of e the plurality of player characters PC are displayed so that a bonding surface between the upper and lower image display screens 51, 52 is set to a starting point of each of individual life point meters for the plurality of player characters PC, and the remaining HPs of the player characters PC displayed on the upper and lower image display screens 51, 52 in the individual life point meters respectively extend from the starting point thereof to upward and downward directions opposite to the starting point. Thus, when each of the player characters PC suffers damage or the HP of each of the player characters PC is recovered using an item, an ending point of the player character PC (will be described later) of the corresponding bar-shaped mater is changed (moved) in the upward or downward direction (that is, the length of the corresponding bar-shaped meter is changed). Therefore, it can be expected that the player can view a present state and/or transition of the HP value of each of the player characters PC. The bar-shaped meter in the HP gauge is displayed so that when the HP of any player character is increased or decreased, the length thereof is respectively to become longer or shorter, for example.

Further, since the player can grasp, as a whole, the bar-shaped meter of each of the player characters PC displayed so as to cross a boundary line between the upper and lower image display screens 51, 52, the player is allowed to directly grasp a state of total fighting potential of the player characters PC in the tag team (that is, a state of the total HP value).

In this regard, hereinafter, in the present embodiment, processes when the player character PC (hereinafter, referred to as a "player character 42") displayed on the upper image display screen 51 is operated using the keypad 30 and the player character PC (hereinafter, referred to as a "player character 43") displayed on the lower image display screen 52 is operated using the touch panel 40 will be described.

Figure 3:
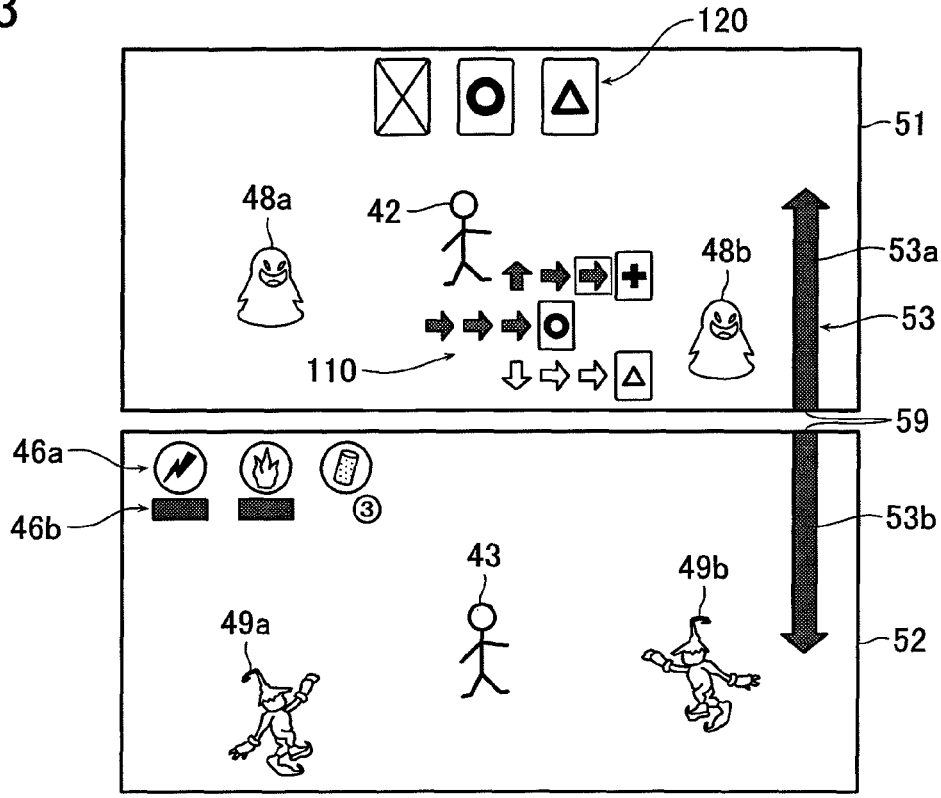
FIG. 3 is an explanatory drawing that shows an example of an image display screen of a display device.

In the video game apparatus 100 of the present embodiment, examples of the upper and lower image display screens 51, 52 at the battle process (Step S109) described above will first be described. FIG. 3 is an explanatory drawing that shows an example of the upper and lower image display screens 51, 52 of the display device 50 in the video game apparatus 100 of the present embodiment. In this regard, FIG. 3 shows the case of becoming a battle mode (battle scene) in which the player characters 42, 43 respectively battle against enemy characters.

As shown in FIG. 3, for example, on the upper image display screen 51 of the display device 50, during a battle, the player character 42 is displayed in the vicinity of the center of the upper image display screen 51, and enemy characters 48*a*, 48*b* are displayed at the left side from the player character 42. Further, a group of card type icons 120 is displayed at an upper middle side of the upper image display screen 51. The card type icons 120 are displayed so that a display image indicating a specific image presented by each of end display icons of operation guidance (will be described later) is normally in a hidden (or closed) state (that is, in the case where one surface of one card type icon 120 on which a display image is drawn is a front surface, the other surface, that is, a back surface of the card type icon 120 is normally displayed). Moreover, operation guidance 110 is displayed at a lower middle side of the upper image display screen 51. The operation guidance 110 is used to instruct the player to regularly and sequentially continue to carry out operational inputs to the keypad 30.

On the other hand, on the lower image display screen 52 of the display device 50, the player character 43 is displayed in the vicinity of the center of the lower image display screen 52, and two enemy characters 49*a*, 49*b* are displayed at both of the left and right sides of the player character 43. Further, for example, a group of icons 46*a* and a usage gauge 46*b* are displayed at an upper left side of the lower image display screen 52. The group of icons 46*a* is utilized to cause the player to select any one of the icons 46*a* including an attack, an item and the like that the player 43 can utilize. The usage gauge 46*b* is utilized to display the number of usage times (usage count) of each of the attack, item and the like selected by the group of icons 46*a*.

Moreover, an HP gauge 53 is continuously displayed in the vicinity of right ends of the upper and lower image display screens 51, 52 for presenting the hit points of the player characters 42, 43 so as to cross the upper and lower image display screens 51, 52 over a predetermined boundary (or so as to extend from the upper image display screen 51 to the lower image display screen 52). The HP gauge 53 includes a bar-shaped meter 53*a* for the player character 42 and a bar-shaped meter 53*b* for the player character 43. The HP gauge 53 is provided so that a display state of the bar-shaped meters 53*a*, 53*b* in the HP gauge 53 is changed by seamlessly changing the display form of the HP gauge 53, in order to display the HPs of the respective player characters 42, 43 in a shared state (that is, a state where the HPs of the respective player characters 42, 43 are summed), and to display a change state of the whole HP in connection with the present state and/or transition of the HP of each of the player characters 42, 43 in a easily viewable state for the player.

In this regard, in the HP gauge 53 of the present embodiment, the bar-shaped meter 53*a* shows the remaining HP of the player character 42, while the bar-shaped meter 53*b* shows the remaining HP of the player character 43. Further, the display position of the ending point 54 of the bar-shaped meter 53*a* and the display position of the ending point 55 of the bar-shaped meter 53*b* respectively show present states of the remaining HPs of the player characters 42, 43 (see FIG. 4). Moreover, a boundary position 59 at the lower side of the upper image display screen 51 shows a zero point of the HP of the player character 42, while a boundary position 59 at the upper side of the lower image display screen 52 shows a zero point of the HP of the player character 43. Thus, both end portion of the HP gauge 53 indicates maximum points of the HPs of the player characters 42, 43, respectively. In the case where the HP of any one of the player characters 42, 43 becomes zero or less, the bar-shaped meters 53*a*, 53*b* are displayed so that the corresponding ending point 54 or 55 crosses over the boundary position 59 to move to the other upper or lower image display screen 51 or 52 (that is, in the state where one encroaches on the other) (for example, see FIG. 13).

Figure 4:
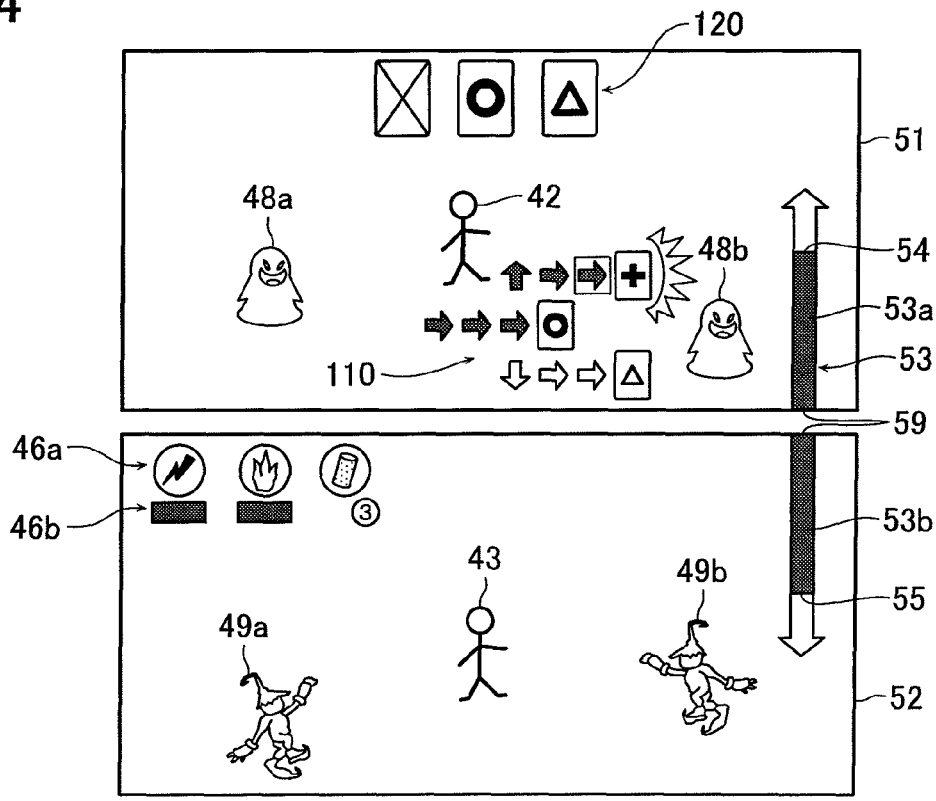
FIG. 4 is an explanatory drawing that shows an operation method relating to an attack of a player character.

Here, an operation method relating to an attack of each of the player characters 42, 43 on the upper and lower image display screen 51, 52 will now be described. FIGS. 4 and 5 are explanatory drawings that show an operation method relating to an attack of each of the player character 42, 43. As shown in FIG. 4, the operation method relating to an attack of the player character 42 on the upper image display screen 51 is executed as follows, for example.

Namely, the player precisely carries out input operations to the cross key 31 of the keypad 30 corresponding to the player character 42 in accordance with the operation guidance 110 displayed on the upper image display screen 51, by which it is possible to select a desired image icon displayed at an end position via a plurality of operation instruction icons. The control section 11 thus selects, as a prediction card, a card type icon having the image displayed in the image icon (for example, the control section 11 selects and displays the plurality of operation instruction icons by means of a cursor for prediction (not shown in the drawings). In the case where the control section 11 determines that the image of the image icon is included in the group of card type icons 120, the image of the card type icon is displayed. On the other hand, in the case where the control section 11 determines that the image of the image icon is not included in the group of card type icons 120, the image of other card type icon is displayed instantaneously.

Then, when the player carries out all of the operation inputs using the cross key 31 of the keypad 30 in accordance with the operation guidance 110 and the images of all of the card type icons in the group of card type icons 120 are displayed, an attack against enemy characters 48*a*, 48*b* of the player character 42 is executed. In this manner, for example, the video game apparatus 100 is constructed so that the player character 42 executes only a battle action without applying an operation instruction relating to movement thereto.

Figure 5A:
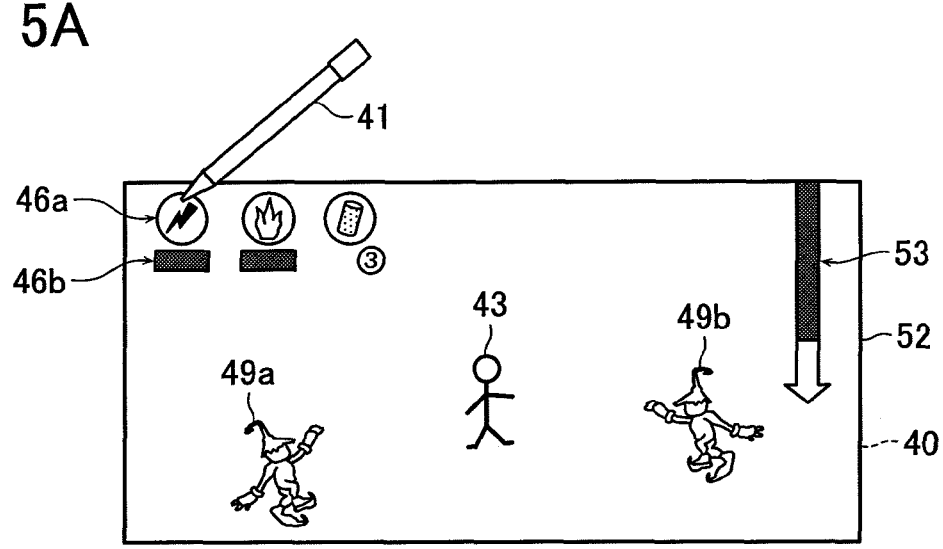
FIG. 5 is an explanatory drawing that shows an operation method relating to an attack of the player character.
Figure 5B:
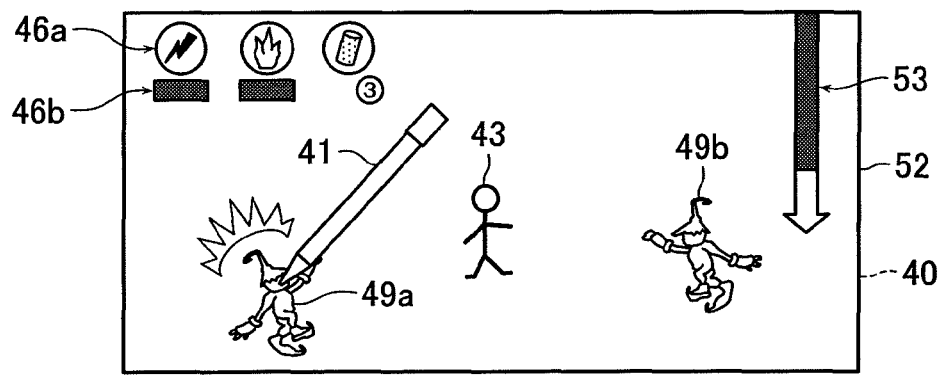

On the other hand, as shown in FIG. 5, the operation method relating to an attack of the player character 43 on the lower image display screen 52 is executed as follows, for example. Namely, as shown in FIG. 5A, the player touches any one of the group of icons 46*a*, which abstractly expresses attacks that the player character 43 can use, on the touch panel 40 corresponding to the player character 43 with the touch pen 41 or the like to select the one icon. As shown in FIG. 5B, the player then specifies an enemy character 49*a* (or an enemy character 49b), which the player wants to cause the player character 43 to attack, by touching the enemy character 49a or 49b on the touch panel 40 with the touch pen 41.

Figure 5C:
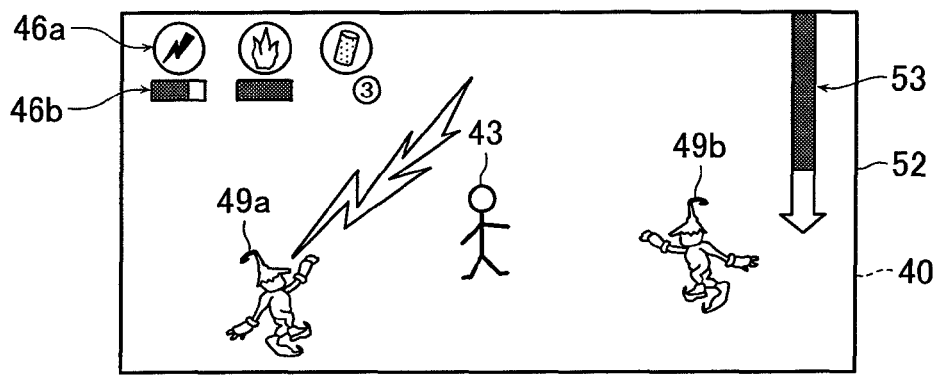

As shown in FIG. 5C, the selected attack is executed against the enemy character 49a or 49b, and a meter display of the usage gauge 46b of the selected attack is changed. In the case where the player character 43 is caused to approach the enemy character 49a, for example, the player selects the player character 43 by touching the player character 43 with the touch pen 41, and slides the touch pen 41 toward a position where the player wants to move in the state where the player touches the player character 43 on the touch panel 40. Thus, the player can move the player character 43 to a desired position. In this manner, for example, the video game apparatus 100 is constructed so that the player can provide an operation instruction relating to movement during the battle action.

In this regard, as described above, the video game apparatus 100 may be constructed so that an attack can be applied to any of the enemy characters 49a, 49b by means of operations as follows in place of the operations by selecting any one of the group of icons 46a with the touch pen 41 (step (1)) and specifying the enemy character 49a (or the enemy character 49b) (step (2)). Namely, by carrying out a predetermined operation such as "picking", "rubbing" and "enclosing so as to draw a circle" using the touch pen 41 with respect to the region on the lower image display screen 52 on which the enemy character 49a that the player wants to cause the player character 43 to attack is displayed, the player character 43 can apply the attack according to the operation of the player to the enemy character 49a.

Thus, since the player character can attack an enemy character even by omitting the step (1) to select an attack method and the step (2) to specify an enemy character described above, the player can give an attack instruction to the player character 43 more quickly. In addition, since the player can cause the player character 43 to attack the enemy character 49a or 49b by directly touching the image of each of the displayed enemy characters 49a, 49b with the touch pen 41, the player can easily realize the operations, and this makes it possible to improve realism (realistic sensation) of a battle scene on the player.

In this regard, even in the case where an attack is to be applied to an enemy character by carrying out the predetermined operations described above, the kinds of attacks that the player can select is limited to those displayed on the lower image display screen 52 by means of the group of icons 46a. For this reason, for example, in the case where an operation "enclosing so as to draw a circle" is associated with a "blaze attack" to attack the enemy character 49a (or the enemy character 49b) with a blaze in advance, it is need to include an icon indicating the "blaze attack" in the group of icons 46a displayed on the lower image display screen 52.

Thus, in the case where the player carries out the operation "enclosing so as to draw a circle" when the icon indicating the "blaze attack" is not included in the group of icons 46a displayed on the lower image display screen 52, the "blaze attack" is not executed. Even in the case where an attack is executed against the enemy character 49a (or the enemy character 49b) by carrying out the predetermined operation described above, the meter display of the usage gauge 46b for the icon used in the attack is changed.

Further, the group of icons 46a thus displayed may include, in the group of icons 46a thus displayed, an icon to cause the damage of the player character 43 to be recovered in addition to the icons indicating the kinds of attack against the enemy characters 49a, 49b. In this case, by touching the icon with the touch pen 41 to select it, the process such as a change of the display of the HP gauge 53 indicating the HP of the player character 43 is executed immediately.

Figure 6:
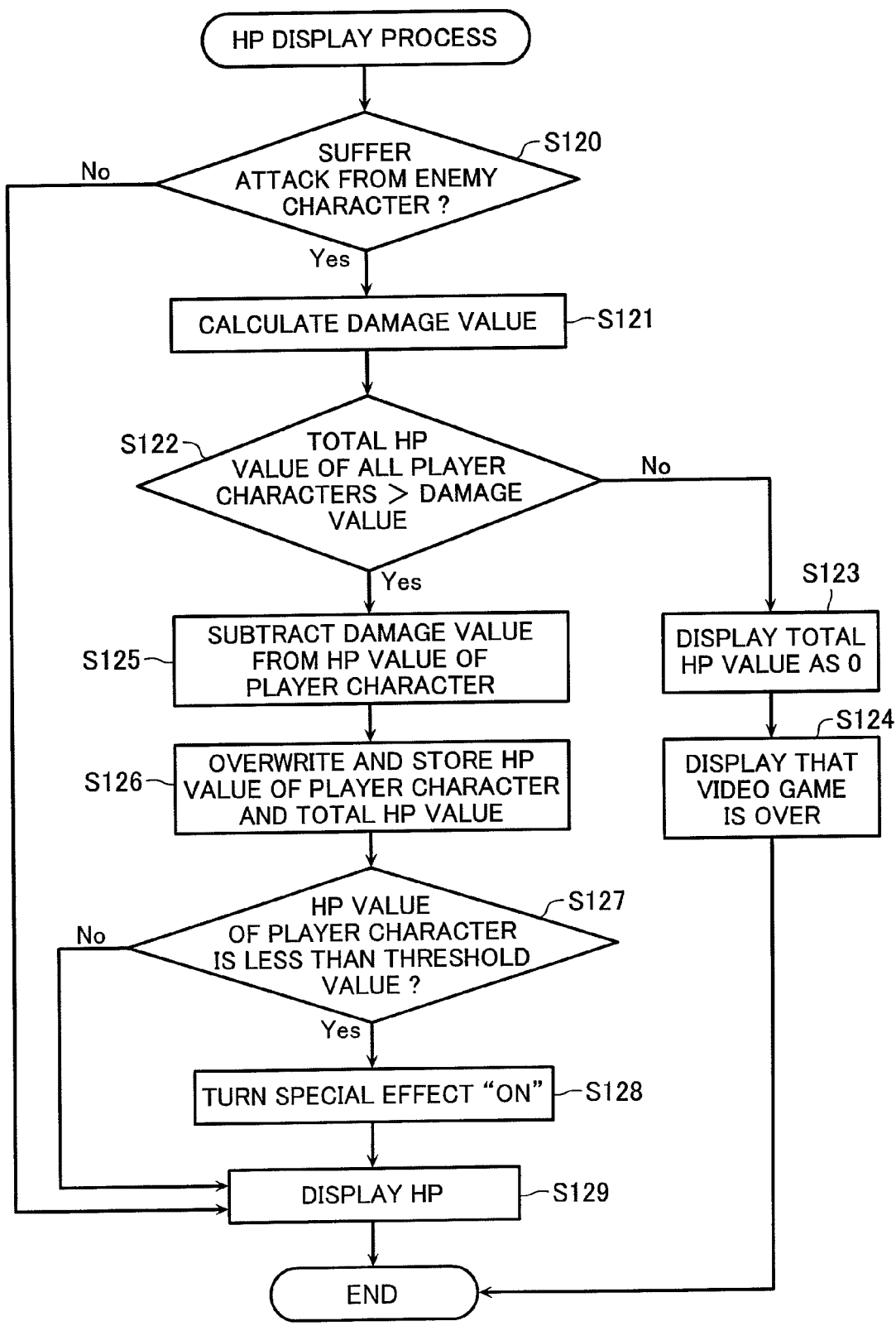
FIG. 6 is a flowchart that illustrates an example of an HP display process for the player character.

Next, an HP display process for each of the player characters 42, 43 in the battle process (Step S109) described above will now be described in the video game apparatus 100 of the present embodiment to which the HP gauge 53 is applied. First, an HP display process relating to damage determination of each of the player characters 42, 43 will be described. In this regard, since the HP display process is executed for each of the player characters 42, 43, the process for the player character 42 will mainly be explained below. However, the similar process is also to be executed for the player character 43. FIG. 6 is a flowchart that illustrates an example of the HP display process relating to damage determination for the player character 42 in the video game apparatus 100 of the present embodiment.

As a premise of the process, in an initial state of a battle scene, the control section 11 refers to character status information including a maximum HP value of each of the player characters 42, 43 that are defined in advance to calculate a total HP value of the respective player characters 42, 43. The control section 11 then causes the display device 50 to display the HPs of the respective player characters 42, 43 in accordance with the calculated total HP value at the HP gauge 53.

More specifically, since the HPs of the player characters 42, 43 in the character status information are respectively set to the maximum values thereof at the initial state, each of the bar-shaped maters 53a, 53b of the HP gauge 53 is displayed so as to have a maximum length in a direction from the boundary position 59 to its end position as shown in FIG. 3.

The control section 11 determines whether or not the player character 42 suffers an attack from at least one of the enemy characters 48a, 48b (Step S120). In the case where it is determined that the player character 42 does not suffer the attack ("No" at Step S120), the processing flow shifts to Step S129. The control section 11 then causes the display device 50 to continue to display the HPs of the respective player characters 42, 43 stored in the character status information (Step S129), and a series of processes in this flowchart is terminated.

In the case where it is determined that the player character 42 suffers the attack ("Yes" at Step S120), the control section 11 referst an attack data table, stored in the ROM, RAM or the like, in which various types of information relating to attacks by an enemy character are arranged to calculate a damage value that the player character 42 suffers by the attack of the enemy character on the basis of the kind of attack, the level of the enemy character and the like (Step S121). The control section 11 determines whether or not a total HP value of all player characters that the player can operate is more than the calculated damage value (Step S122).

In the case where it is determined that the total HP value is the damage value or less ("No" at Step S122), the control section 11 causes the display device 50 to display the total HP value of the player characters 42, 43 as zero in the HP gauge 53 (Step S123). The control section causes the display device 50 to display not only each of the player characters 42, 43 as a battle impossible state, but also that the video game is over (that is, the video game becomes terminated) (Step S124). Then, the series of processes in this flowchart is terminated.

In this regard, as an example to display that the total HP value becomes zero at Step S123 described above, it may be mentioned that the bar-shaped meters 53a, 53b of the HP gauge 53 are displayed, for example, at the state where the ending points 54, 55 of the respective bar-shaped meters 53a, 53b, each of which is opposite to the boundary position 59, are overlapped with each other in the HP gauge 53 (for example, see FIG. 15, which will be described later).

In the case where it is determined that the total HP value is over the damage value ("Yes" at Step S122), the control section 11 subtracts the damage value from the HP value of the player character 42 (Step S125). The control section 11 overwrites and stores the HP value of the player character 42 and the total HP value of all of the player characters in the character status information on the basis of the subtraction result (Step S126). The control section 11 then determines whether the HP value of the player character 42 is less than a predetermined threshold value or not (Step S127).

In the case where it is determined that the HP value of the player character 42 is not less than the predetermined threshold value ("No" at Step S127), the control section 11 shifts the processing flow to Step S129 to cause the display device 50 to display the HP (Step S129). Then, the series of processes in this flowchart is terminated.

In the case where it is determined that the HP value of the player character 42 becomes less than the predetermined threshold vale ("Yes" at Step S127), the control section 11 turns a special effect on, thereby causing the display device 50 to execute a display of the special effect (Step S128). The control section 11 then causes the display device 50 to display the HPs of the respective player characters 42, 43 (Step S129), and the series of processes in this flowchart is terminated. In this regard, the HP display process relating to such damage determination is also executed simultaneously in parallel to the player character 43 as described above.

Here, more specifically, the display of the special effect executed at Step S128 is executed, for example, on the upper image display screen 51 (or the lower image display screen 52) on which the player character 42 (or 43) determined that the HP value thereof becomes less than the predetermined threshold value is displayed by changing the color of the player character 42 (or 43) itself, the bar-shaped meter 53a (or 53b) in the HP gauge 53 in which the HP of the player character 42 (or 43) is displayed, or the background, or displaying it so as to blink (or flash), or changing the display state of the bar-shaped meter 53a (or 53b) in the HP gauge 53, which respectively corresponds to the player character 42 or 43, into a special state (for example, changing the color thereof and displaying it so as to blink (or flash) or the like). Namely, the display of the special effect can present the player with a situation that the HP of corresponding player character 42 (or 43) gets closer to zero point or that the HP of corresponding player character 42 (or 43) falls below the zero point.

Figure 7:
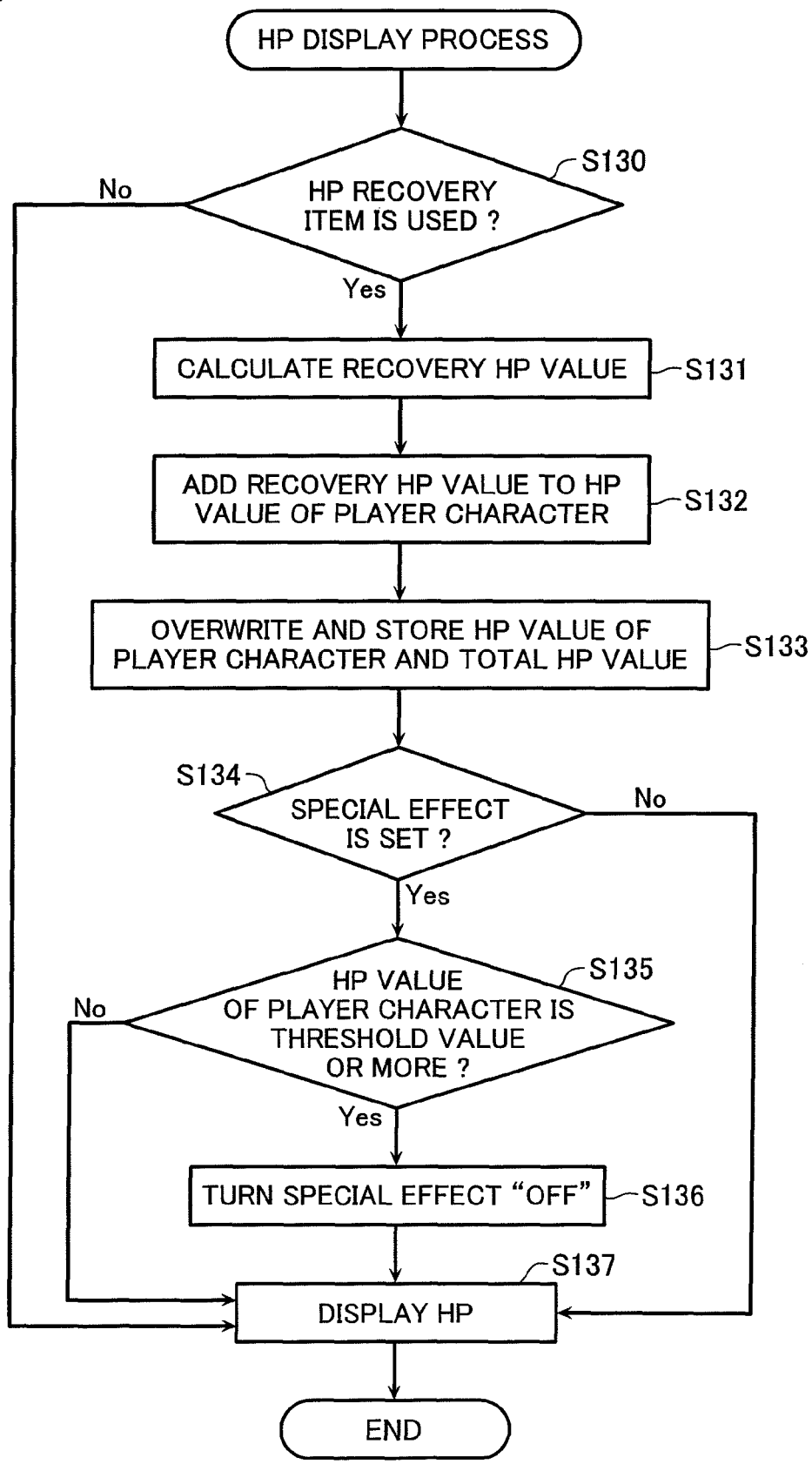
FIG. 7 is a flowchart that illustrates another example of the HP display process for the player character.

Next, an HP display process relating to recovery of the HP value of each of the player characters 42, 43 will be described. FIG. 7 is a flowchart that illustrates another example of the HP display process relating to the recovery of the HP value of the player character 42 in the video game apparatus 100 of the present embodiment.

Here, as a premise of the process, the control section 11 also refers to character status information including a maximum HP value of each of the player characters 42, 43 that are defined in advance to calculate a total HP value of the respective player characters 42, 43. The control section 11 then causes the display device 50 to display the HPs of the respective player characters 42, 43 in accordance with the calculated total HP value at the HP gauge 53.

The control section 11 determines whether or not an HP recovery item is used for the player character 42 as one of HP value recovery events for recovering the HP value of the corresponding player character (Step S130).

In the case where it is determined that the HP recovery item is not used ("No" at Step S130), the processing flow shifts to Step S137. The control section 11 then causes the display device 50 to display the HP of the player character 42 stored in the character status information (Step S137), and a series of processes in this flowchart is terminated.

In the case where it is determined that the HP recovery item is used ("Yes" at Step S130), the control section 11 calculates a recovery amount of the HP value (recovery HP value) by means of the used HP recovery item (Step S131), and adds the calculated recovery HP value to the HP value of the player character 42 on the basis of the calculation result (Step S132). The control section 11 overwrites and stores the HP value of the player character 42 and the total HP value of all of the player characters in the character status information (Step S133). The control section 11 then determines whether or not the special effect is set for the player character 42 at present (Step S134).

In the case where it is determined that the special effect is not set for the player character 42 at present ("No" at Step S134), the control section 11 shifts the processing flow to Step S137 to cause the display device 50 to display the HP (Step S137). Then, the series of processes in this flowchart is terminated.

In the case where it is determined that the special effect is set for the player character 42 at present ("Yes" at Step S134), the control section 11 determines whether or not the overwritten HP value of the player character 42 is a predetermined threshold value or more (Step S135). In the case where it is determined that the overwritten HP value of the player character 42 is the predetermined threshold vale or more ("Yes" at Step S135), the control section 11 turns the special effect off, thereby releasing the setting of the special effect (Step S136). The control section 11 then causes the display device 50 to display the HP of the player character 42 (Step S137), and the series of processes in this flowchart is terminated. In this regard, the HP display process relating to such HP value recovery is also executed simultaneously in parallel to the player character 43 as described above.

Next, display examples of the upper and lower image display screens 51, 52 on which the HP display process described above is executed will be explained in the video game apparatus 100 of the present embodiment. FIGS. 8 to 16 are explanatory drawings that show an example of the upper and lower image display screens 51, 52 of the display device 50 in the video game apparatus 100 of the present embodiment on which the HP display process is executed.

Figure 8:
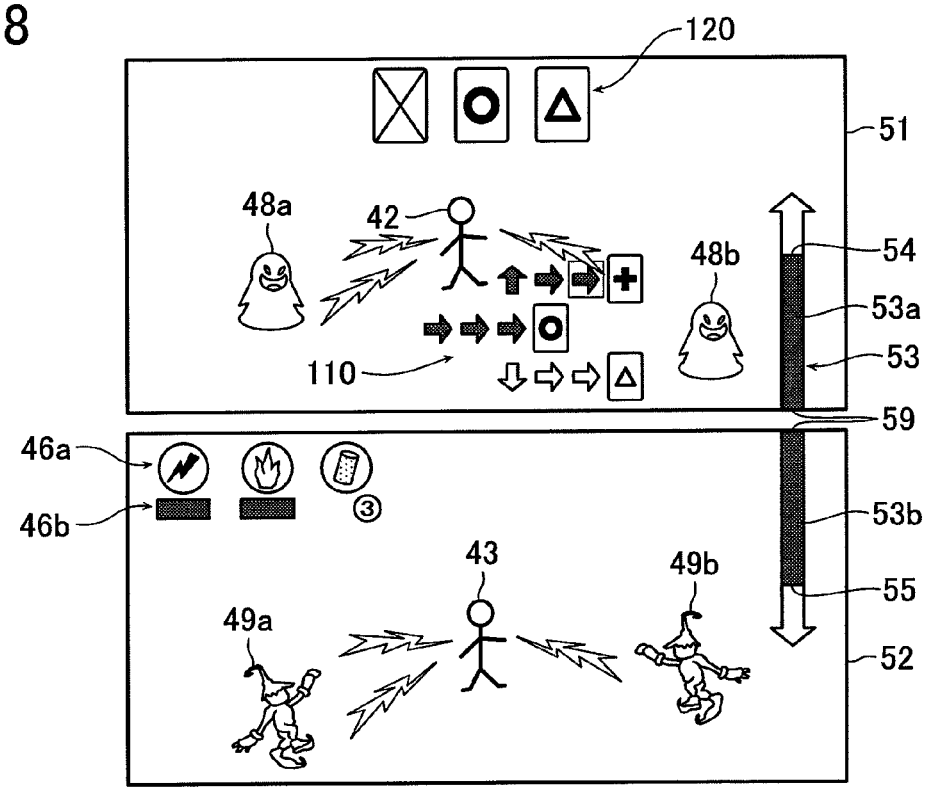
FIG. 8 is an explanatory drawing that shows an example of the image display screen of the display device on which the HP display process is executed.

As shown in FIG. 8, for example, in the case where both of the player characters 42, 43 respectively suffer an attack from at least one of the enemy characters 48a, 48b and at least one of the enemy characters 49a, 49b, the HP gauge 53 changes from the state where the bar-shaped meters 53a, 53b are displayed so that the HPs of the player characters 42, 43 are respectively the maximum values as shown in FIG. 3 to the state where the bar-shaped meters 53a, 53b are displayed so that the damage values for the suffered attacks are respectively subtracted from the HPs of the player characters 42, 43.

Namely, in such a case, the bar-shaped meters 53a, 53b of the HP gauge 53 are displayed, on the upper and lower image display screens 51, 52, in the state the ending points 54, 55 of the bar-shaped meters 53a, 53b, which are opposite to the boundary positions 59, 59 thereof, get close to the boundary positions 59, 59 by the damage values for the suffered attacks.

Figure 9:
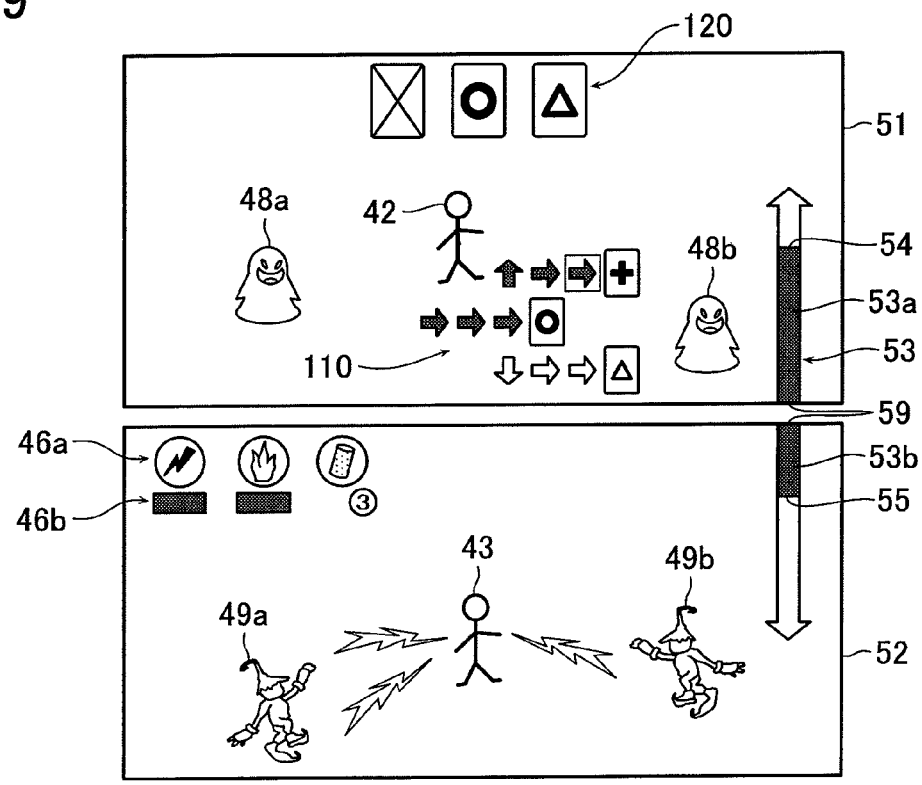
FIG. 9 is an explanatory drawing that shows an example of the image display screen of the display device on which the HP display process is executed.

Then, for example, in the case where the player character 43 suffers an attack from at least one of the enemy characters 49a, 49b when the bar-shaped meters 53a, 53b in the HP gauge 53 are respectively in the states as shown in FIG. 8, the HP gauge 53 becomes the state where the ending point 55 of the bar-shaped meter 53b further gets close to the boundary position 59 as shown in FIG. 9, and changes to the state where the bar-shaped meter 53b is displayed so that the damage value for the suffered attack is subtracted from the HP of the player character 43.

Figure 10:
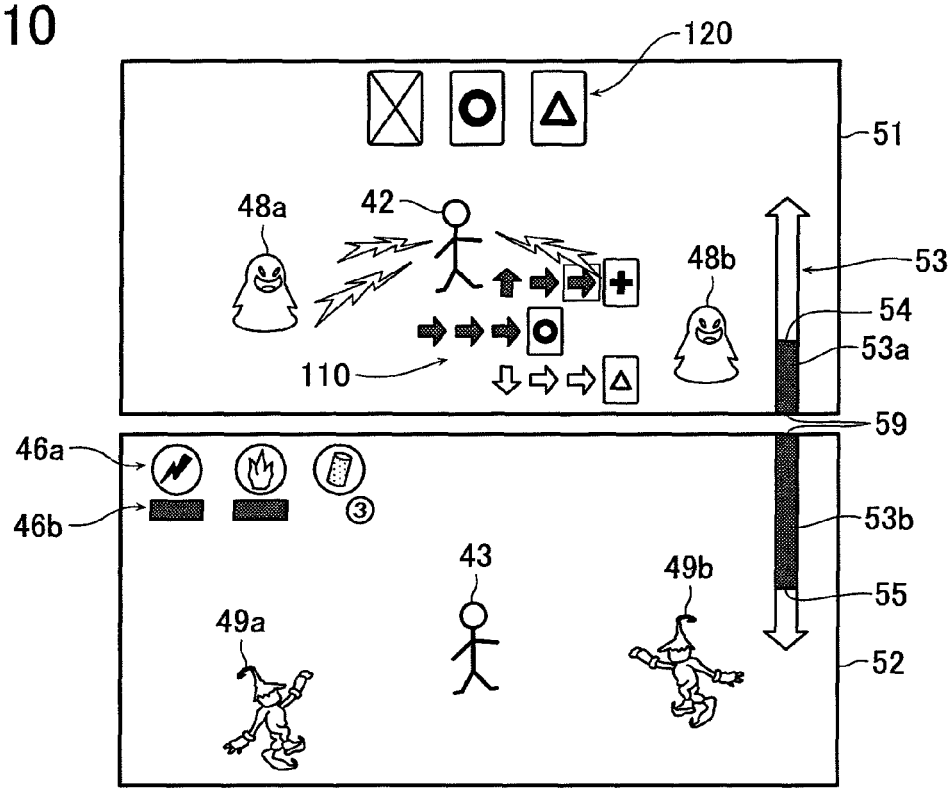
FIG. 10 is an explanatory drawing that shows an example of the image display screen of the display device on which the HP display process is executed.

Similarly, for example, in the case where the player character 42 suffers an attack from at least one of the enemy characters 48a, 48b when the bar-shaped meters 53a, 53b in the HP gauge 53 are respectively in the states as shown in FIG. 8, the HP gauge 53 becomes the state where the ending point 54 of the bar-shaped meter 53a further gets close to the boundary position 59 as shown in FIG. 10, and changes to the state where the bar-shaped meter 53a is displayed so that the damage value for the suffered attack is subtracted from the HP of the player character 42.

Figure 11:
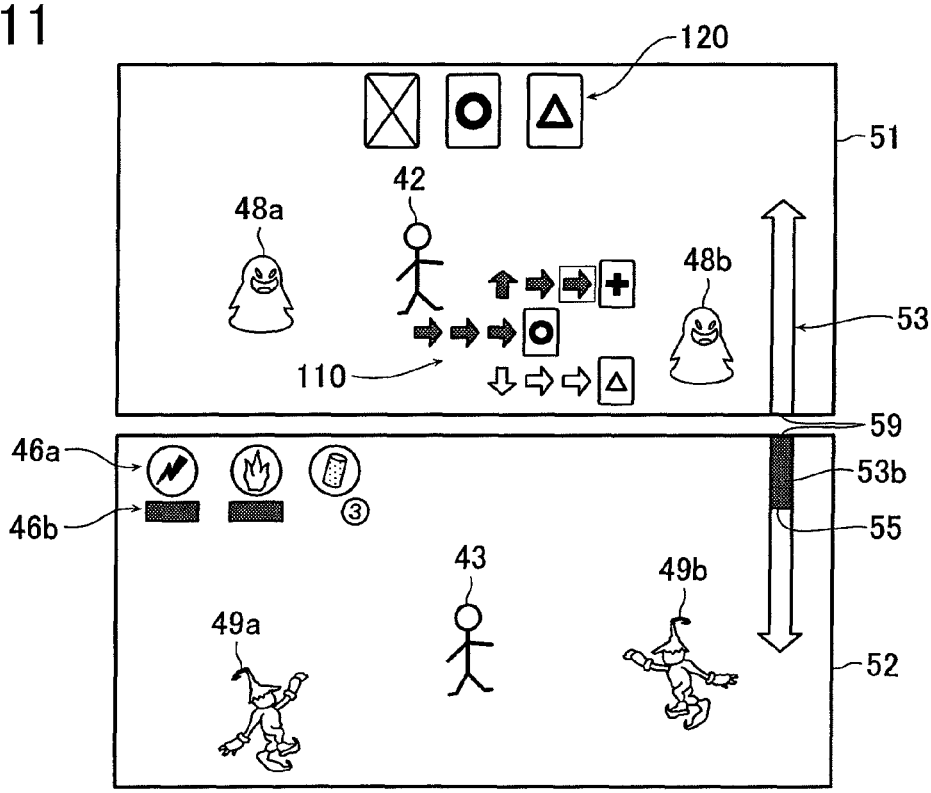
FIG. 11 is an explanatory drawing that shows an example of the image display screen of the display device on which the HP display process is executed.

Further, as shown in FIG. 11, for example, in the case where the player character 42 suffers an attack from at least one of the enemy characters 48a, 48b and the HP value of the player character 42 becomes zero (that is, there becomes no display of the bar-shaped meter 53a from the HP gauge 53), the player character 42 becomes a battle impossible state in a normal video game, and the player character 42 is displayed so as to fall down on the upper image display screen 51, for example. However, in the present embodiment, although the HP of the player character 42 becomes zero, the player character 42 is displayed in a battle continuable state so long as the HP of the player character 43 still remains (that is, the bar-shaped meter 53b is still displayed). At this time, the HP gauge 53 changes to the state where the ending point 54 of the bar-shaped meter 53a displayed on the upper image display screen 51 is overlapped with the boundary position 59 thereof and the bar-shaped meter 53a is not displayed.

Figure 12:
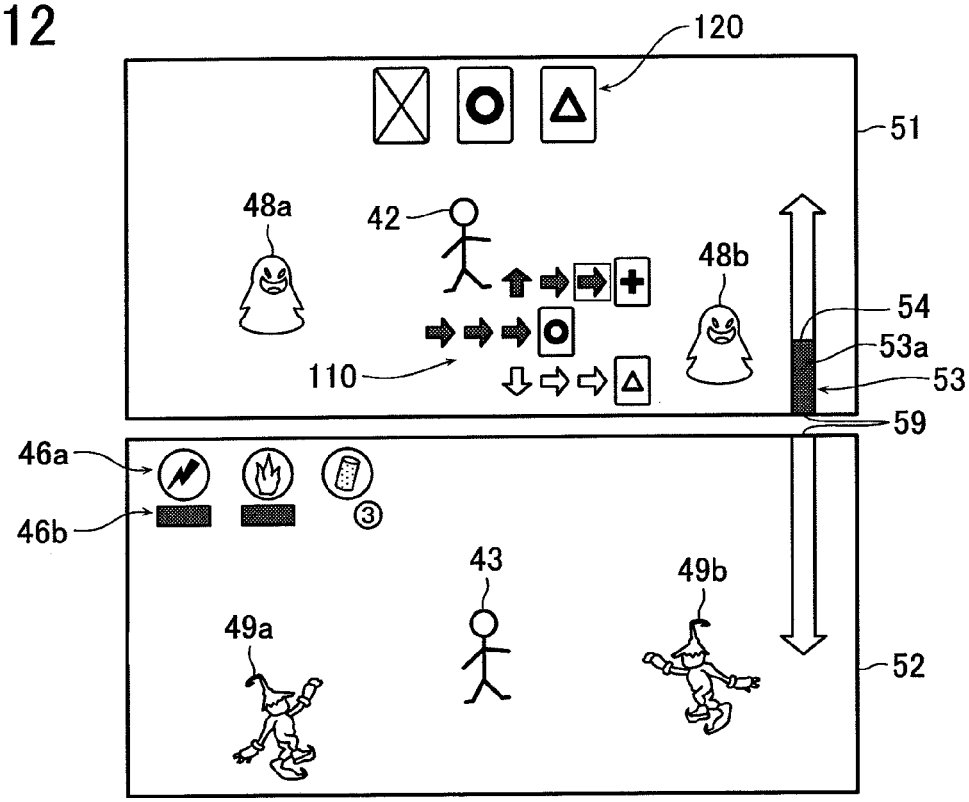
FIG. 12 is an explanatory drawing that shows an example of the image display screen of the display device on which the HP display process is executed.

Similarly, as shown in FIG. 12, for example, in the case where the player character 43 suffers an attack from at least one of the enemy characters 49a, 49b and the HP value of the player character 43 becomes zero (that is, there becomes no display of the bar-shaped meter 53b from the HP gauge 53), the player character 43 becomes a battle impossible state in a normal video game, and the player character 43 is displayed so as to fall down on the lower image display screen 52, for example. However, in the present embodiment, although the HP of the player character 43 becomes zero, the player character 43 is displayed in a battle continuable state so long as the HP of the player character 42 still remains (that is, the bar-shaped meter 53a is still displayed). At this time, the HP gauge 53 changes to the state where the ending point 55 of the bar-shaped meter 53b displayed on the lower image display screen 52 is overlapped with the boundary position 59 thereof and the bar-shaped meter 53b is not displayed.

Thus, in the video game apparatus 100 of the present embodiment, in the case where the HP of any one of the player characters 42, 43 is displayed in the corresponding bar-shaped meter 53a or 53b of the HP gauge 53 even when the HP of the other player character 42 or 43 becomes zero (for example, the upper and lower image display screens 51, 52 becomes any one of the states as shown in FIGS. 11 and 12), the video game apparatus 100 is constructed so that both of the player characters 42, 43 can continue to battle any enemy character. Thus, the player can sequentially carry out simultaneous operations for the plurality of player characters 42, 43 just before both of the player characters 42, 43 become a battle impossible state (that is, the video game is over). This makes it possible to improve interest of the player in the video game by causing the player to heighten his or her strategic thought.

In such a case, the video game apparatus 100 of the present embodiment is constructed so that, when one player character whose HP has become zero further suffers an attack from any enemy character, the damage value of the suffered attack is reflected to the HP of the other player character to interact with each other. Thus, the display of the HP gauge 53 in this case becomes as follows.

Figure 13:
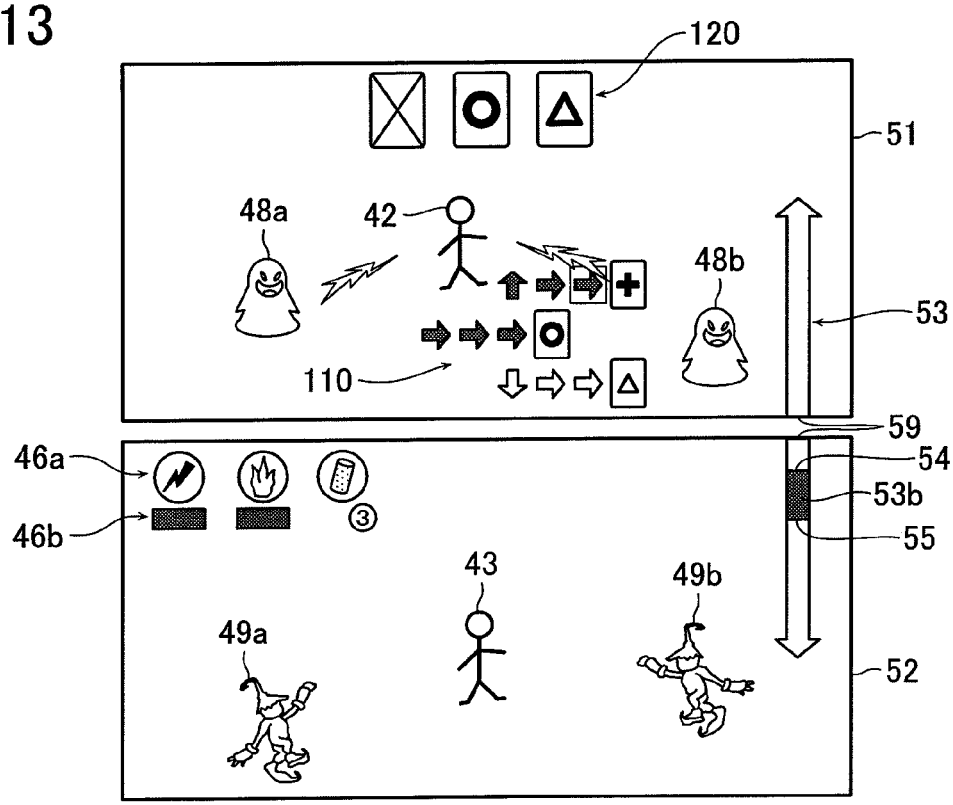
FIG. 13 is an explanatory drawing that shows an example of the image display screen of the display device on which the HP display process is executed.

Namely, as shown in FIG. 13, for example, in the case where the player character 42 whose HP has become zero further suffers an attack from at least one of the enemy characters 48a, 48b, the HP gauge 53 becomes the state where the ending point 54 of the bar-shaped meter 53a that has been displayed on the upper image display screen 51 is displayed so as to get across the boundary positions 59 of the upper and lower image display screens 51, 52 and to get close to the ending point 55 of the bar-shaped meter 53b displayed on the lower image display screen 52. Thus, even when the player character 43 does not suffer an attack after the HP of the player character 42 becomes zero, the HP gauge 53 changes to the state where the HP of the player character 43 is reduced by the damage value of the attack applied to the player character 42.

Figure 14:
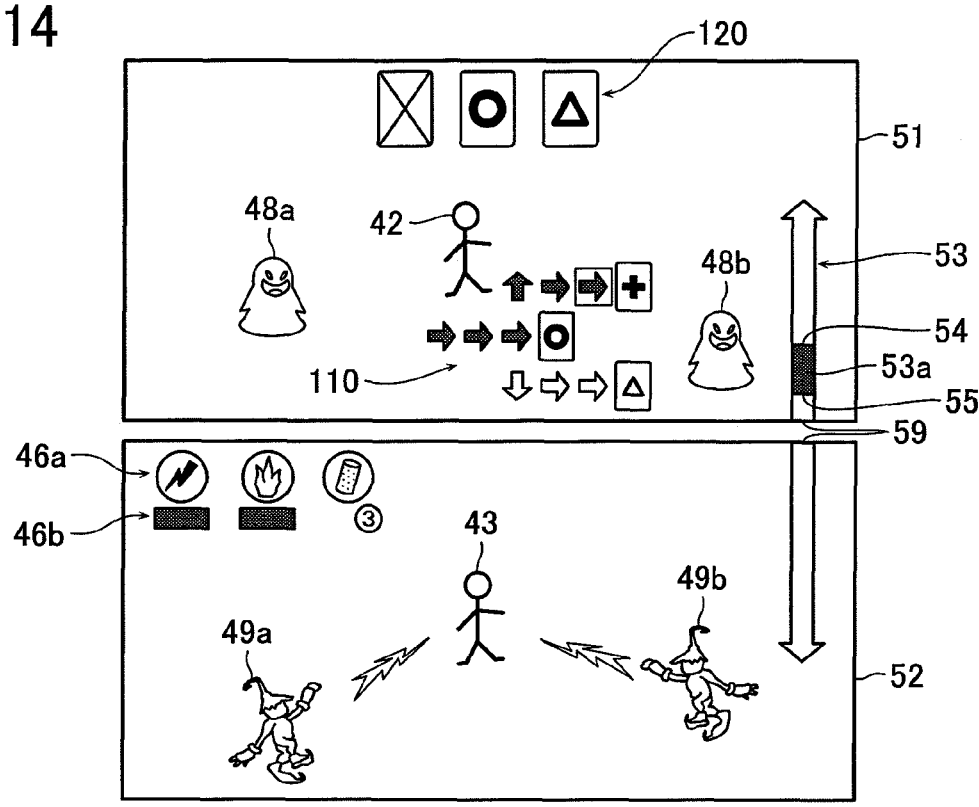
FIG. 14 is an explanatory drawing that shows an example of the image display screen of the display device on which the HP display process is executed.

Similarly, as shown in FIG. 14, for example, in the case where the player character 43 whose HP has become zero further suffers an attack from at least one of the enemy characters 49a, 49b, the HP gauge 53 becomes the state where the ending point 55 of the bar-shaped meter 53b that has been displayed on the lower image display screen 52 is displayed so as to get across the boundary positions 59 of the lower and upper image display screens 52, 51 and to get close to the ending point 54 of the bar-shaped meter 53a displayed on the upper image display screen 51. Thus, even when the player character 42 does not suffer an attack after the HP of the player character 43 becomes zero, the HP gauge 53 changes to the state where the HP of the player character 42 is reduced by the damage value of the attack applied to the player character 43.

Then, in the case where the player character 43, for example, further continues to suffer an attack from at least one of the enemy characters 49a, 49b when the bar-shaped meter 53b in the HP gauge 53 is in the state as shown in FIG. 13 (that is, the state where the HP of the player character 42 is zero or less and the HP of the player character 43 still remains), the ending point 55 of the bar-shaped meter 53b displayed on the lower image display screen 52 further gets close to the ending point 54. Thus, as shown in FIG. 15, in the case where the ending points 54, 55 of the bar-shaped meters 53a, 53b in the HP gauge 53 are finally overlapped with each other and the HPs of both of the player characters 42, 43 thus disappears (that is, the total HP value becomes the damage value or less), the HP gauge 53 changes to the state where the bar-shaped meters 53a, 53b are not displayed and the ending points 54, 55 are displayed on the lower image display screen 52 so as to be overlapped with each other. In addition, both of the player characters 42, 43 are respectively displayed on the upper and lower image display screens 51, 52 in the state where the player characters 42, 43 fall down for indicating the battle impossible states. In the case where the player characters 42, 43 are in the reverse states (that is, in the case of the state as shown in FIG. 14), the HP display process is also executed in the similar manner. Thus, the description thereof is omitted.

Figure 16:
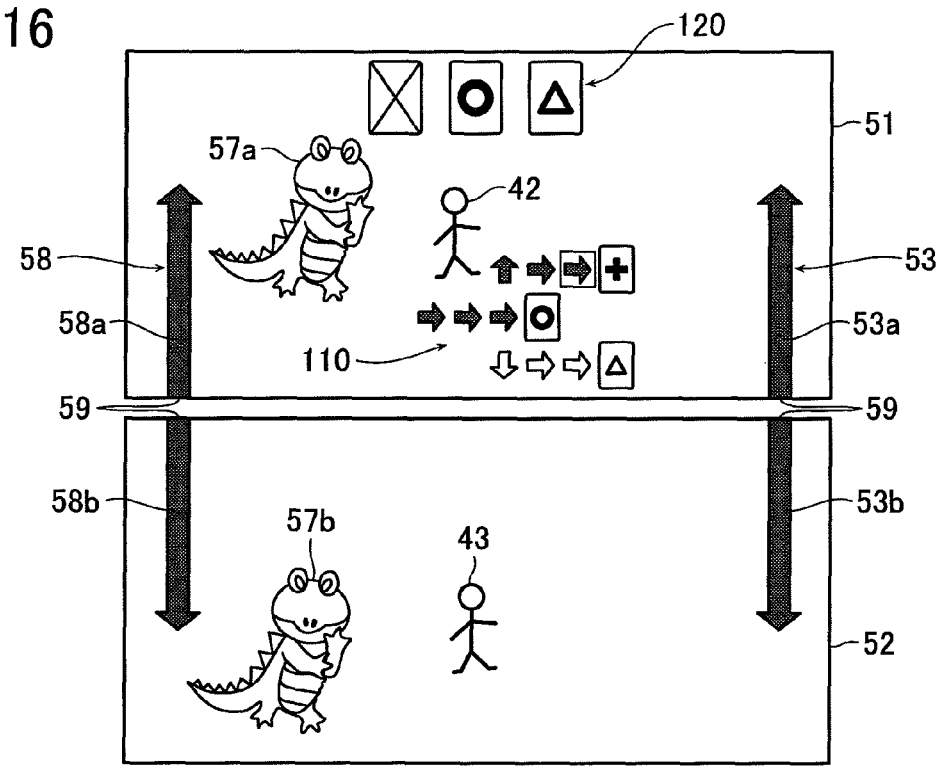
FIG. 16 is an explanatory drawing that shows an example of the image display screen of the display device on which the HP display process is executed.

In this regard, in the case where specific enemy characters (such as a boss character) appear on the upper and lower image display screen 51, 52 in the battle scene as shown in FIG. 16, the video game apparatus 100 may be constructed so that such a HP display process is applied to a HP display for each of the specific enemy characters 57a, 57b. In this case, an HP gauge 58 for the specific enemy characters 57a, 57b may be displayed in the vicinity of the left side of each of the upper and lower image display screens 51, 52. Further, the HP gauge 58 may be constituted from a bar-shaped meter 58a for indicating the HP of the specific enemy character 57a and a bar-shaped meter 58b for indicating the HP of the specific enemy character 57b. The HP gauge 58 may be displayed continuously so as to cross the upper and lower image display screens 51, 52 over a predetermined boundary between boundary positions 59, 59 (or so as to extend from the upper image display screen 51 to the lower image display screen 52).

As explained above, in the embodiment described above, the remaining HPs of the plurality of player characters 42, 43 are respectively displayed at the positions of the ending points 54, 55 of the bar-shaped meters 53a, 53b in the integrated state in the HP gauge 53 so as to cross the upper and lower image display screens 51, 52 (see Step S129 and the like). Further, in the case where an action or an event occurs so that the remaining HP value of any one of the plurality of player characters 42, 43 is to be changed, the amount of change of the HP value of the corresponding player character 42 or 43 is calculated in accordance with the action or the event (see Step S125 and the like). Moreover, the remaining HP value of the player character is updated on the basis of the calculation result (see Step S126 and the like). In this case, in the case where the remaining HP value of the player character is shown so as to be reduced in accordance with the updated remaining life point, the position of the ending point 54 or 55 of the bar-shaped meter 53a or 53b is displayed so as to be moved toward the starting point thereof (that is, in the direction to the other ending point 54 or 55) (see FIG. 9 and the like). In addition, in the case where the remaining HP value of the player character is shown so as to be increased in accordance with the updated remaining life point, the position of the ending point 54 or 55 of the bar-shaped meter 53a or 53b is displayed so as to be moved in the direction away from the starting point thereof (that is, in the direction away from the other ending point 54 or 55). Thus, it is possible to display the remaining HP values of the player characters 42, 43 in the bar-shaped meter 53a, 53b in which a display form thereof is changed in accordance with the remaining HP values together. In addition, it is also possible to display the amount of change of the HP value of a predetermined player character 42 or 43 at the same time. Thus, it is possible to display the HP values of the plurality of player characters 42, 43 in the video game so that a single player can easily grasp the HP values of the plurality of player characters 42, 43 to operate the plurality of player characters 42, 43, and it is possible for the player to easily view a present state and transition of the HP value of each of the player characters 42 or 43. Therefore, it is possible to heighten strategic thought in the tag-team match, and this makes it possible to improve interest of the player in the video game.

Further, in the embodiment described above, in the case where the remaining HP value of any one of the player characters 41, 42 is shown so as to be reduced in accordance with the updated remaining HP value, a display form of the corresponding bar-shaped meter 53a or 53b is changed and displayed so that the ending point 54 or 55 of the bar-shaped meter 53a or 53b is moved toward the starting point thereof (see FIG. 8 and the like). In addition, in the case where the remaining HP value of any one of the player characters 41, 42 is shown so as to be increased in accordance with the updated remaining HP value, a display form of the corresponding bar-shaped meter 53a or 53b is changed and displayed so that the ending point 54 or 55 of the bar-shaped meter 53a or 53b is moved in the direction away from the starting point thereof. Thus, it is possible for the player to further easily view a present state and transition of the HP value of each of the player characters 42, 43. Therefore, it is possible to heighten strategic thought in the tag-team match, and this makes it possible to improve interest of the player in the video game.

Moreover, in the embodiment described above, in the case where the bar-shaped meters 53a, 53b are shown so that the remaining HP value of any one of the player characters 42, 43 is the maximum value, the remaining HP value of the corresponding player character 42 or 43 is displayed so that a middle point (or boundary) between the bar-shaped meters 53a, 53b is set to zero point (see FIG. 11 and the like). Then, in the case where the remaining HP value of any one of the player characters 42, 43 is to be reduced or increased over the zero point of the HP value, display the ending point 54 or 55 of the bar-shaped meter 53a or 53b indicating the remaining HP value of the corresponding player character 42 or 43 is displayed so as to be capable of moving over the zero point of the HP value in the corresponding bar-shaped meter 53a or 53b. Thus, even in the case where the HP value of the player character 42 or 43 becomes zero, it is possible for the player to further easily view a present state and transition of the HP value of other player character 43 or 42 while continuing to play the video game so long as the HP value of the other player character 43 or 42 still remains. Therefore, it is possible to heighten strategic thought in the tag-team match, and this makes it possible to improve interest of the player in the video game.

Furthermore, in the embodiment described above, in the case where the display device 50 includes two image display screens, for example, the upper and lower image display screens 51, 52, the HP gauge 53 is displayed so as to cross the two image display screens 51, 52, and the bar-shaped meters 53a, 53b are displayed so that the boundary position 59 between the upper and lower image display screens 51, 52 is set to the zero point of the HP value. Thus, it is possible for the player to easily view a present state and transition of the HP value of each of the player characters 42, 43 displayed on the upper and lower image display screens 51, 52 in real time and uniquely. Therefore, it is possible to heighten strategic thought in the tag-team match, and this makes it possible to improve interest of the player in the video game.

Figure 15:
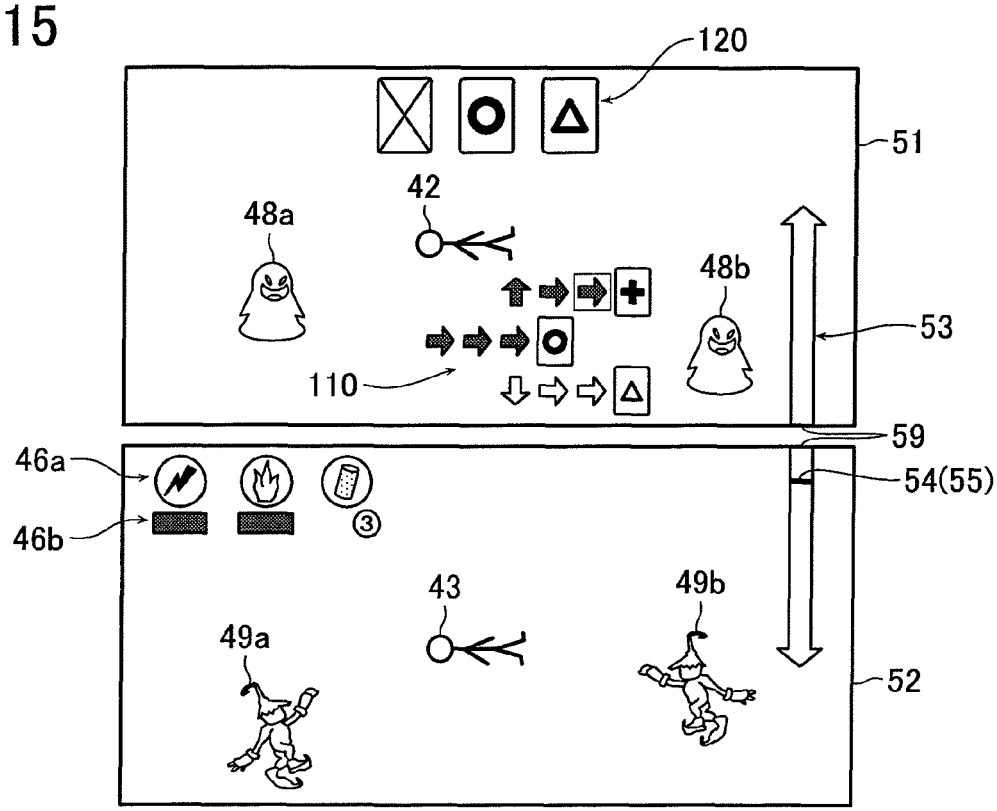
FIG. 15 is an explanatory drawing that shows an example of the image display screen of the display device on which the HP display process is executed.

Further, in the embodiment described above, in the case where the positions of the ending points 54, 55 of the bar-shaped meters 53a, 53b are displayed so as to be overlapped in the HP gauge 53 (see FIG. 15). Thus, it is possible for the player to easily view a present state and transition of the HP value of each of the player characters 42, 43. In addition, it is possible for the player to view the end of the video game obviously. Therefore, it is possible to heighten strategic thought in the tag-team match, and this makes it possible to improve interest of the player in the video game.

Moreover, in the embodiment described above, in the case where any player character 42 or 43 suffers an attack from an attack target character 48a, 48b or 49a, 49b for the player character 42 or 43, the amount of change of the HP value for subtracting a damage point in accordance with the attack from the remaining HP value of the corresponding player character 42 or 43 is calculated. Further, in the case where an event to recover the HP value of any player character 42 or 43 occurs for the player character 42 or 43, the amount of change of the HP value for adding a recovery point in accordance with the event to the remaining life point of the corresponding player character is calculated. Thus, even in the case where the HP value of one player character 42 or 43 becomes zero, it is possible for the player to further easily view a present state and transition of the life point of other player character 43 or 42 while continuing to play the video game so long as the HP value of the other player character 43 or 42 still remains. Therefore, it is possible to heighten strategic thought in the tag-team match, and this makes it possible to improve interest of the player in the video game.

For example, the amount of change of the HP value on the basis of the damage value or the recovery value may be calculated by referring to a preset parameter and the like in accordance with the kind of attack or recovery event, and the bar-shaped meters 53a, 53b is displayed in the HP gauge 53 in the calculated amount of change of the HP value. Thus, it is possible to execute the variable HP display of each of the player characters 42, 43 in the HP gauge 53 in accordance with the kind of attack or recovery event, a stage of the battle scene or the like, and this makes it possible to expect that the interest of the player in the video game is further improved.

Furthermore, in the embodiment described above, another bar-shaped meters 58a, 58b for respectively showing remaining HP values of specific enemy characters 57a, 57b such as boss characters are further displayed in an HP gauge 58 other than the HP gauge 53 on the upper and lower image display screens 51, 52 (see FIG. 16). Thus, it is possible for the player to easily view a present state and transition of the HP value of each of the specific enemy characters 57a, 57b in addition to the plurality of player characters 42, 43. This makes it possible to improve interest of the player in the tag-team match of the video game.

In this-regard, in the embodiment described above, the player character 42 is associated with the keypad 30, while the player character 43 is associated with the touch panel 40. However, for example, the video game apparatus 100 may be constructed so that: the player character 42 is associated with the cross key 31 of the keypad 30; the player character 43 is associated with the group of buttons 32; an input detection region of the touch panel 40 is divided into two sub regions; and the player characters 42, 43 are respectively associated with the sub regions.

In addition, the method of attacking the enemy characters by the player characters 42, 43 described above is just an example thereof. The method is not limited thereto. For example, a method of employing the enemy characters by pressing a specific button of the keypad 30, and a method of employing a technique corresponding to a command by utilizing the cross key 31 or the like may be mentioned without any problem.

Further, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention. The display device 50 may include any image display screen other than the upper and lower image display screens 51, 52. In addition, the display device 50 may be constituted so that one image display screen is divided into a plurality of image display screens in order to obtain a similar effect.

In this case, the video game apparatus 100 is constructed so that the number of operable player characters is set equal to the number of image display screens or the number of separated display regions, and the player characters are respectively arranged in the image display screens or the separated display regions. In this regard, the HPs of the player characters existing in the image display screens or the separated display regions may be displayed using boundary portions of the image display screens or boundary portions of the separated display regions. An example as follows may specifically be mentioned.

Figure 17:
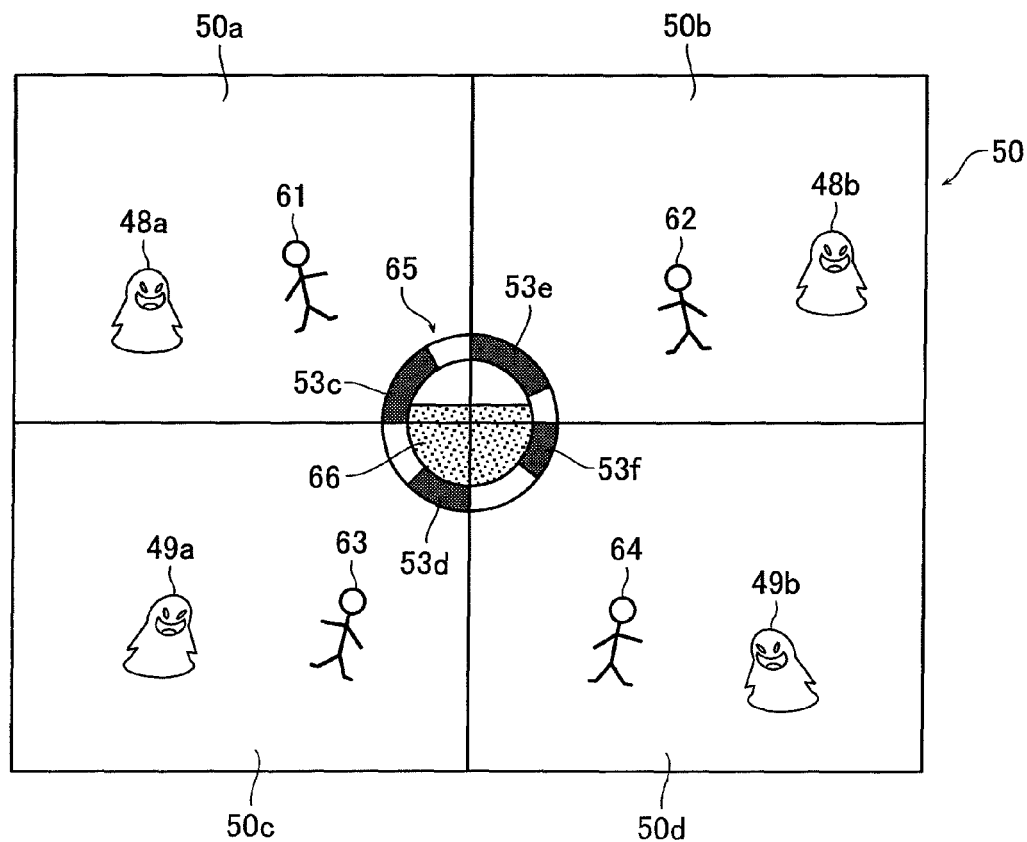
FIG. 17 is an explanatory drawing that shows an example of the image display screen of the display device on which another HP display process is executed.

FIG. 17 is an explanatory drawing that shows an example of the image display screens of the display device 50 on which another HP display process is executed. As shown in FIG. 17, four display regions 50a, 50b, 50c and 50d are provided by dividing the image display region of the display device 50 into four. Four player characters 61, 62, 63, and 64 and four enemy characters 48a, 48b, 49a and 49b are respectively displayed in the four display regions 50a, 50b, 50c and 50d.

Moreover, a HP gauge 65 displayed as a circular shape is provided in adjacent boundary portion of each of the display regions 50a to 50d in the vicinity of the central portion of the image display screen of the display device 50. The circular-shaped HP gauge 65 is provided with four partial circular-shaped meters 53c, 53d, 53e and 53f for respectively displaying HPs of the player characters 61 to 64, and a HP meter 66 for displaying a total HP of the player characters 61 to 64 in a region enclosed by the partial circular-shaped meters 53c to 53f.

The partial circular-shaped meters 53c to 53f are displayed so as to indicate that the HP of each of the player characters 61 to 64 is reduced when an amount of meter display thereof is changed in a counterclockwise direction, for example. The HP meter 66 is displayed so as to indicate that the total HP is reduced when an amount of meter display thereof is changed from the upside to the downside. When the amount of meter display of each of the partial circular-shaped meters 53c to 53f is changed, the amount of meter display of the HP meter 66 is also changed relative to each other. Further, in the case where the amount of meter display of any one of the partial circular-shaped meter 53c to 53f for any one of the player characters 61 to 64 becomes zero and the corresponding player character 61, 62, 63 or 64 further suffers an attack (that is, the HP of the corresponding player character 61, 62, 63 or 64 becomes a value under zero), the amounts of meter display for other player characters are evenly changed in a clockwise direction in response to the attack suffered by the corresponding player character.

The remaining HP values of the player characters 61 to 64 respectively existing in the display regions 50a to 50d are displayed using a space between the boundaries of the two adjacent display regions 50a to 50d in this manner. Thus, it is possible to display the partial circular-shaped meters 53c to 53f so that the player can easily view a present state of each of the HPs of the player characters 61 to 64. In addition, since the total remaining HP value of the plurality of operable player characters 61 to 64 is displayed in the central portion of the image display screen of the display device 50 like the HP meter 66, the player is allowed to judge the whole progress of the battle easily.

Furthermore, in the embodiment described above, the HP gauge 53 may be constructed so that the length of the HP gauge 53 is changed in response to the character status information including the level of each of the player characters 42, 43, and the length of the HP gauge 53 becomes longer in accordance with an increase of the level of each of the player characters 42, 43. Thus, the player can understand the strength of each of the player characters 42, 43 at a glance. Therefore, by comparing the length of the HP gauge 58 for the specific enemy characters 57a, 57b with the length of the HP gauge 53 for the player characters 42, 43 when the HP gauge 58 is displayed for the specific enemy characters 57a, 57b as described above, the player can easily compare a potential value (potential HP value) of the player characters 42, 43 with a potential value of the specific enemy characters 57a, 57b. In this regard, the length of each of the HP gauges 53, 58 just represents the potential value therefor. For this reason, the fact that the length of the HP gauge 58 for the enemy characters 57*a*, 57*b* is longer than the length of the HP gauge 53 for the player characters 42, 43 does not always simply mean that it is difficult for the player characters 42, 43 to bring down the enemy characters 57*a*, 57*b* or the player cannot bring down the enemy characters 57*a*, 57*b*.

Further, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Moreover, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Furthermore, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a plurality of player characters on an image display screen of the image display apparatus, the video game processing apparatus controlling progress of a video game by controlling an action of each of the plurality of player characters to be displayed on the image display screen in accordance with operations by a player, the video game processing apparatus comprising:
 a remaining life point manager that manages a remaining life point of each of the plurality of player characters;
 a life point display controller that causes the image display apparatus to display a life point meter that shows a total remaining life point within a life point display region on the image display screen, the total remaining life point indicating the total sum of the remaining life points of the plurality of player characters;
 an individual life point display controller that causes the image display apparatus to display individual life point meters for respectively showing the remaining life points of the plurality of player characters in the life point display region on the image display screen;
 a life point variation calculator that calculates, when an action or an event occurs with respect to any one of the plurality of player characters so that the remaining life point of the corresponding player character changes, an amount of change of a life point of the player character in response to the action or the event;
 a battle maintenance determiner that determines whether a battle possible state of all of the player characters can be maintained or not by comparing the amount of change of the life point calculated by the life point variation calculator with the total sum of the remaining life points of the player characters managed by the remaining life point manager; and
 a life point updater that updates the remaining life point of the corresponding player character on the basis of the amount of change of the life point calculated by the life point variation calculator,
 wherein the battle maintenance determiner determines that the battle possible state of all of the player characters can be maintained except that the amount of change of the life point, calculated by the life point variation calculator, to be subtracted from the total remaining life point is the total remaining life point or more, and
 wherein, when the life point updater updates the remaining life point of any player character managed by the remaining life point manager, the life point display controller causes the image display apparatus to change a display form of a part of the life point meter assigned to the corresponding player character;
 wherein the plurality of player characters comprises two player characters,
 wherein the life point meter is a bar-shaped meter formed by connecting the two individual life point meters, respectively assigned to the two player characters, with each other so as to become a bar shape, the remaining life point of each of the two player characters is displayed so that a bonding surface between the two individual life point meters is set to a starting point of each of the two individual life point meters, and each individual life point meter extends from the starting point thereof to a direction opposite to the starting point,
 wherein, when the remaining life point of any one of the two player characters is shown as reduced in accordance with the remaining life point updated by the life point updater, the life point display controller causes the image display apparatus to change a display form of the corresponding individual life point meter so that an ending point of the individual life point meter is moved toward the starting point thereof, and wherein, when the remaining life point of any one of the two player characters is shown as increased in accordance with the remaining life point updated by the life point updater, the life point display controller causes the image display apparatus to change a display form of the corresponding individual life point meter so that an ending point of the individual life point meter is moved in the direction away from the starting point thereof, wherein the life point display controller causes the image display apparatus to display the remaining life points of the two player characters in which a boundary between the individual life point meters of the two player characters is set to zero point of life point in each of the individual life point meters, and wherein, when the remaining life point of any one of the two player characters is to be reduced or increased over the zero point of the life point in the corresponding individual life point meter, the life point display controller causes the image display apparatus to display the ending point of the individual life meter indicating the remaining life point of the corresponding player character so as to be capable of moving over the zero point of the life point in the corresponding individual life meter.

2. The video game processing apparatus according to claim 1, wherein, when any player character suffers an attack from an attack target character for the player character, the life point variation calculator calculates the amount of change of the life point for subtracting a damage point in accordance with the attack from the remaining life point of the corresponding player character, and wherein, when an event to recover the life point of any player character occurs for the player character, the life point variation calculator calculates the amount of change of the life point for adding a recovery point in accordance with the event to the remaining life point of the corresponding player character.

3. The video game processing apparatus according to claim 1, wherein the life point display controller causes the image display apparatus to further display another life point meter for showing a remaining life point of a specific attack target character in a display region other than the life point display region on the image display screen.

4. The video game processing apparatus according to claim 1, wherein the life point display controller causes the image display apparatus to display the life point meter into which the individual life point meters respectively corresponding to at least three of the plurality of player characters are incorporated.

5. The video game processing apparatus according to claim 1, wherein, when the image display apparatus comprises two image display screens, the life point display controller causes the image display apparatus to display the life point display region so as to cross the two image display screens, and to display the individual life point meters so that a boundary position between the two adjacent image display screens is set to the zero point of the life point.

6. The video game processing apparatus according to claim 1, wherein, when the battle maintenance determiner determines that the battle possible state of all of the two player characters cannot be maintained because the amount of change of the life point, calculated by the life point variation calculator, to be subtracted from the total remaining life point is the total remaining life point or more, the life point display controller causes the image display apparatus to display the life point meter so that the ending points of the two individual life point meters are overlapped with each other in the life point display region.

7. The video game processing apparatus according to claim 1, further comprising:

a player character display controller that causes the image display apparatus to respectively display the plurality of player characters on a plurality of display regions different from each other, wherein the life point display controller causes the image display apparatus to display a part of the life point meter corresponding to each of the plurality of player characters on the display region on which the corresponding player character is displayed.

8. The video game processing apparatus according to claim 1, wherein the life point updater updates the remaining life point even when the remaining life point of any one of the plurality of player characters becomes a negative quantity.

9. The video game processing apparatus according to claim 8, further comprising:

a special display controller that causes the image display apparatus to display, with a special form, any one of the player characters whose remaining life point becomes a negative quantity, the background of the image display screen on which the corresponding player character is displayed, and a part of the life point meter corresponding to the player character.

10. A non-transitory computer-readable medium including a computer program product for processing a video game, progress of the video game being controlled by causing an image display apparatus to display a plurality of player characters of the video game on an image display screen of the image display apparatus, and controlling an action of each of the plurality of player characters displayed on the image display screen in accordance with operations by a player, the computer program product causing a computer to execute:

causing the image display apparatus to display a life point meter for showing a total remaining life point within a life point display region on the image display screen, the total remaining life point indicating the total sum of remaining life points of the plurality of player characters, the remaining life points being respectively managed for the plurality of player characters;

causing the image display apparatus to display individual life point meters for respectively showing the remaining life points of the plurality of player characters in the life point display region on the image display screen;

when an action or an event occurs with respect to any one of the plurality of player characters so that the remaining life point of the corresponding player character changes, calculating an amount of change of a life point of the player character in response to the action or the event;

determining whether a battle possible state of all of the player characters can be maintained or not by comparing the amount of change of the life point thus calculated with the total sum of the remaining life points thus managed; and updating the remaining life point of the corresponding player character on the basis of the amount of change of the life point thus calculated, wherein in the determining whether a battle possible state, it is determined that the battle possible state of all of the player characters can be maintained except that the amount of change of the life point thus calculated to be subtracted from the total remaining life point is the total remaining life point or more, wherein, in the updating the remaining life point, when the remaining life point of any player character is updated, the image display apparatus is caused to change a display form of a part of the life point meter assigned to the corresponding player character;

wherein the plurality of player characters comprises two player characters, wherein the life point meter is a bar-shaped meter formed by connecting the two individual life point meters, respectively assigned to the two player characters, with each other so as to become a bar shape, the remaining life point of each of the two player characters is displayed so that a bonding surface between the two individual life point meters is set to a starting point of each of the two individual life point meters, and each individual life point meter extends from the starting point thereof to a direction opposite to the starting point, wherein, in the causing display of a total remaining life point, when the remaining life point of any one of the two player characters is shown as reduced in accordance with the remaining life point updated in the updating the remaining life point, the image display apparatus is caused to change a display form of the corresponding individual life point meter so that an ending point of the individual life point meter is moved toward the starting point thereof, wherein, in the causing display of a total remaining life point, when the remaining life point of any one of the two player characters is shown as increased in accordance with the remaining life point updated in the updating the remaining life point, the image display apparatus is caused to change a display form of the corresponding individual life point meter so that an ending point of the individual life point meter is moved in the direction away from the starting point thereof, wherein, in the causing display of a total remaining life point, the image display apparatus is caused to display the remaining life points of the two player characters in which a boundary between the individual life point meters of the two player characters is set to zero point of the life point in each of the individual life point meters, and wherein, in the causing display of a total remaining life point, when the remaining life point of any one of the two player characters is to be reduced or increased over the zero point of the life point in the corresponding individual life point meter, the image display apparatus is caused to display the ending point of the individual life meter indicating the remaining life point of the corresponding player character so as to be capable of being moved over the zero point of the life point in the corresponding individual life meter.

11. The non-transitory computer-readable medium including the computer program product according to claim 10, wherein, in the causing display of a total remaining life point, when the image display apparatus comprises two image display screens, the image display apparatus is caused to display the life point display region such that the two image display screen are crossed, and to display the individual life point meters so that a boundary position between the two adjacent image display screens is set to the zero point of the life point.

12. The non-transitory computer-readable medium including the computer program product according to claim 10, wherein, in the causing display of a total remaining life point, when, in the determining whether a battle possible state is possible, it is determined that the battle possible state of all of the two player characters cannot be maintained because the amount of change of the life point, calculated in the calculating an amount of change of a life point, to be subtracted from the total remaining life point is the total remaining life point or more, the image display apparatus is caused to display the life point meter so that the ending points of the two individual life point meters are overlapped with each other in the life point display region.

13. The non-transitory computer-readable medium including the computer program product according to claim 10, wherein, in the calculating an amount of change of a life point, when any player character suffers an attach from an attack target character for the player character, the amount of change of the life point form subtracting a damage point in accordance with the attack from the remaining life point of the corresponding player characters is calculated, and wherein, in the calculating an amount of change of a life point, when an event to recover the life point of any player character occurs for the player character, the amount of change of the life point for adding a recovery point in accordance with the event to the remaining life point of the corresponding player character is calculated.

14. The non-transitory computer-readable medium including the computer program product according to claim 10, wherein, in the causing display of a total remaining life point, the image display apparatus is caused to further display another life point meter for showing a remaining life point of a specific attack target character in a display region other than the life point display region on the image display screen.

15. The non-transitory computer-readable medium including the computer program product according to claim 10, wherein, in the causing display of a total remaining life point, the image display apparatus is caused to display the life point meter into which the individual life point meters respectively corresponding to at least three of the plurality of player characters are incorporated.

16. The non-transitory computer-readable medium including the computer program product according to claims 10, wherein the computer is caused to further execute:

causing the image display apparatus to respectively display the plurality of player characters on a plurality of display regions different from each other, and wherein, in the causing display of a total remaining life point, the image display apparatus is caused to display a part of the life point meter corresponding to each of the plurality of player characters on the display region on which the corresponding player character is displayed.

17. The non-transitory computer-readable medium including the computer program product according to claim 10, wherein, in the updating the remaining life point, the remaining life point is updated even when the remaining life point of any one of the plurality of player characters becomes a negative quantity.

18. The non-transitory computer-readable medium including the computer program product according to claim 17, wherein the computer is cause to further execute:

causing the image display apparatus to display, with a special form, any one of the player characters whose remaining life point becomes a negative quantity, the background of the image display screen on which the corresponding player character is displayed, and a part of the life point meter corresponding to the player character.

* * * * *